United States Patent
Oh et al.

(10) Patent No.: US 11,425,661 B2
(45) Date of Patent: Aug. 23, 2022

(54) METHOD AND APPARATUS FOR TRANSMIT SIGNAL POWER CONTROL AND DISCOVERY SIGNAL RESOURCE MULTIPLEXING IN WIRELESS COMMUNICATION SYSTEM

(71) Applicant: Samsung Electronics Co., Ltd., Gyeonggi-do (KR)

(72) Inventors: Jinyoung Oh, Seoul (KR); Yongjun Kwak, Gyeonggi-do (KR); Hyojin Lee, Gyeonggi-do (KR); Hyoungju Ji, Seoul (KR)

(73) Assignee: Samsung Electronics Co., Ltd

( * ) Notice: Subject to any disclaimer, the term of this patent is extended or adjusted under 35 U.S.C. 154(b) by 140 days.

(21) Appl. No.: 16/687,162

(22) Filed: Nov. 18, 2019

(65) Prior Publication Data

US 2020/0092821 A1    Mar. 19, 2020

Related U.S. Application Data

(63) Continuation of application No. 15/028,159, filed as application No. PCT/KR2014/009367 on Oct. 6, 2014, now Pat. No. 10,506,521.

(30) Foreign Application Priority Data

Oct. 8, 2013 (KR) ........................ 10-2013-0120103

(51) Int. Cl.
*H04W 52/14* (2009.01)
*H04W 76/14* (2018.01)
(Continued)

(52) U.S. Cl.
CPC ........ *H04W 52/143* (2013.01); *H04B 7/0626* (2013.01); *H04L 1/1861* (2013.01);
(Continued)

(58) Field of Classification Search
None
See application file for complete search history.

(56) References Cited

U.S. PATENT DOCUMENTS 6,308,637 B1    10/2001    Sheets
7,508,762 B2     3/2009    Ohtani
(Continued)

FOREIGN PATENT DOCUMENTS

CN    102823311    12/2012
EP    2 975 884     1/2016
(Continued)

OTHER PUBLICATIONS

Japanese Office Action dated Mar. 12, 2018 issued in counterpart application No. 2016-521772, 6 pages.
(Continued)

*Primary Examiner* — Gregory B Sefcheck
(74) *Attorney, Agent, or Firm* — The Farrell Law Firm, P.C.

(57) ABSTRACT

Disclosed is a method for transmitting and receiving a signal in a base station of a mobile communication system, the method including generating power control information for device to device (D2D) communication for a terminal and transmitting, to the terminal, a message including an indicator indicative of a power control mode of the terminal in accordance with the generated power control information. In accordance with a method for controlling transmit power of a terminal and a method for selecting a transmit resource in a mobile communication system, mutual interference between the D2D communication and cellular communication can be reduced, and communication efficiency improved.

20 Claims, 17 Drawing Sheets

(51) Int. Cl.

| | |
|---|---|
| *H04B 7/06* | (2006.01) |
| *H04L 1/18* | (2006.01) |
| *H04L 5/26* | (2006.01) |
| *H04W 72/04* | (2009.01) |
| *H04W 48/16* | (2009.01) |
| *H04W 8/00* | (2009.01) |
| *H04W 52/38* | (2009.01) |
| *H04W 52/32* | (2009.01) |
| *H04W 52/24* | (2009.01) |
| *H04W 52/30* | (2009.01) |
| *H04W 52/28* | (2009.01) |

(52) U.S. Cl.
CPC ............ *H04L 5/26* (2013.01); *H04W 52/242* (2013.01); *H04W 52/243* (2013.01); *H04W 52/30* (2013.01); *H04W 52/325* (2013.01); *H04W 52/383* (2013.01); *H04W 72/0473* (2013.01); *H04W 76/14* (2018.02); *H04W 8/005* (2013.01); *H04W 48/16* (2013.01); *H04W 52/281* (2013.01); *H04W 52/386* (2013.01)

(56) References Cited

U.S. PATENT DOCUMENTS

| | | | |
|---|---|---|---|
| 7,519,032 B2 | 4/2009 | Soomro | |
| 7,610,225 B2 | 10/2009 | O'Neill | |
| 7,616,746 B2 | 11/2009 | O'Neill | |
| 7,664,091 B2 | 2/2010 | Batariere | |
| 7,995,583 B2 | 8/2011 | Del Prado Pavon | |
| 8,023,990 B2 | 9/2011 | Parkvall | |
| 8,311,053 B2 | 11/2012 | Choi | |
| 8,504,052 B2 | 8/2013 | Hakola | |
| 8,724,492 B2 | 5/2014 | Frank | |
| 8,897,266 B2 | 11/2014 | Gheorghiu | |
| 8,923,792 B2 | 12/2014 | Park | |
| 8,938,247 B2 | 1/2015 | Gorokhov | |
| 8,942,203 B2 | 1/2015 | Nishikawa | |
| 9,014,031 B2 | 4/2015 | Suzuki | |
| 9,100,924 B2 | 8/2015 | Suzuki | |
| 9,198,136 B2 | 11/2015 | Yang | |
| 9,247,411 B2 * | 1/2016 | Wu | H04W 8/005 |
| 9,344,997 B2 | 5/2016 | Lu | |
| 9,351,340 B2 | 5/2016 | Ribeiro | |
| 9,420,617 B2 | 8/2016 | Kalhan | |
| 9,467,990 B2 | 10/2016 | Ihm | |
| 9,516,638 B2 | 12/2016 | Seo | |
| 9,516,653 B2 | 12/2016 | Yang | |
| 9,544,827 B2 | 1/2017 | Ishii | |
| 9,560,685 B2 | 1/2017 | Kim | |
| 9,572,117 B2 | 2/2017 | Cho | |
| 9,585,108 B2 | 2/2017 | Damnjanovic | |
| 9,635,618 B2 | 4/2017 | Seo | |
| 9,642,099 B2 | 5/2017 | Bagheri | |
| 9,661,441 B2 | 5/2017 | da Silva | |
| 9,699,740 B2 | 7/2017 | Bontu | |
| 9,788,186 B2 * | 10/2017 | Chatterjee | H04W 8/005 |
| 9,807,709 B2 | 10/2017 | Deng | |
| 9,918,318 B2 * | 3/2018 | Fujishiro | H04W 76/14 |
| 9,918,331 B2 | 3/2018 | Yang | |
| 9,930,642 B2 | 3/2018 | Kalhan | |
| 10,034,278 B2 | 7/2018 | Larsson | |
| 10,070,417 B2 | 9/2018 | Kalhan | |
| 10,149,250 B2 | 12/2018 | Wang | |
| 10,264,437 B2 * | 4/2019 | Poitau | H04W 76/14 |
| 10,278,142 B2 | 4/2019 | Bagheri | |
| 10,321,294 B2 * | 6/2019 | Chatterjee | H04W 52/0219 |
| 10,356,803 B2 | 7/2019 | Kim | |
| 10,454,829 B2 * | 10/2019 | Ishii | H04W 28/0289 |
| 10,880,719 B2 * | 12/2020 | Poitau | H04W 72/02 |
| 2005/0108385 A1 * | 5/2005 | Wechter | H04L 43/16 709/224 |
| 2009/0325625 A1 | 12/2009 | Hugi et al. | |
| 2010/0261469 A1 | 10/2010 | Ribeiro | |
| 2010/0317291 A1 | 12/2010 | Richardson | |
| 2011/0275382 A1 | 11/2011 | Hakola et al. | |
| 2012/0064907 A1 | 3/2012 | Jung et al. | |
| 2012/0163252 A1 | 6/2012 | Ahn et al. | |
| 2012/0269072 A1 | 10/2012 | Wu | |
| 2013/0016629 A1 | 1/2013 | Mallik et al. | |
| 2013/0201954 A1 | 8/2013 | Gao | |
| 2013/0230032 A1 | 9/2013 | Lu et al. | |
| 2016/0057604 A1 | 2/2016 | Luo et al. | |
| 2016/0286375 A1 | 9/2016 | Fujishiro | |

FOREIGN PATENT DOCUMENTS

| | | |
|---|---|---|
| JP | 2008-510344 | 4/2008 |
| KR | 1020120074251 | 7/2012 |
| KR | 1020130015094 | 2/2013 |
| KR | 1020150012791 | 2/2015 |
| WO | WO 2010/085055 | 7/2010 |
| WO | WO 2011/138495 | 11/2011 |
| WO | WO 2013/108114 | 7/2013 |
| WO | WO 2013/137580 | 9/2013 |
| WO | WO 2014/034573 | 3/2014 |

OTHER PUBLICATIONS

Chinese Office Action dated Jun. 11, 2018 issued in counterpart application No. 201480055568.1, 15 pages.
Australian Examination Report dated Dec. 2, 2016 issued in counterpart application No. 2014332694, 5 pages.
Pekka Janis et al., "Interference-Aware Resource Allocation for Device-to-Device Radio Underlaying Cellular Networks", XP031474558, IEEE 69th Vehicular Technology Conference, Apr. 26-29, 2009, 5 pages.
Samsung, "Evaluation on WAN Impact of D2D Discovery", R1-134191, 3GPP TSG RAN WG1 Meeting #74bis, Oct. 7-11, 2013, 6 pages.
Nokia, NSN, "D2D Discovery Signal", R1-134538, 3GPP TSG-RAN WG1 Meeting #74bis, Oct. 7-11, 2013, 7 pages.
European Search Report dated Apr. 25, 2017 issued in counterpart application No. 14852036.4-1875, 9 pages.
Japanese Office Action dated Jun. 12, 2017 issued in counterpart application No. 2016-521772, 14 pages.
PCT/ISA/210 Search Report issued on PCT/KR2014/009367 (pp. 3).
PCT/ISA/237 Written Opinion issued on PCT/KR2014/009367 (pp. 6).
CATT: "Further Discussion on Resource Allocation for D2D Discovery", R1-134116, 3GPP TSG RAN WG1 Meeting #74bis, Oct. 7-11, 2013, 6 pages.
Alcatel-Lucent Shanghai Bell et al., "Consideration of Interference Mitigation for D2D Communication", R1-132993, 3GPP TSG-RAN1 Meeting #74, Aug. 19-23, 2013, 4 pages.
European Search Report dated Jan. 3, 2020 issued in counterpart application No. 19213244.7-1219, 13 pages.

* cited by examiner

METHOD AND APPARATUS FOR TRANSMIT SIGNAL POWER CONTROL AND DISCOVERY SIGNAL RESOURCE MULTIPLEXING IN WIRELESS COMMUNICATION SYSTEM

PRIORITY

This application is a Continuation of and claims priority to U.S. application Ser. No. 15/028,159 filed with the U.S. Patent and Trademark Office on Apr. 8, 2016, and issued as U.S. Pat. No. 10,506,521 on Dec. 10, 2019, which is a National Phase Entry of PCT International Application No. PCT/KR2014/009367, which was filed on Oct. 6, 2014, and claims priority to Korean Patent Application No. 10-2013-0120103, which was filed on Oct. 8, 2013, the contents of each of which are incorporated herein by reference.

BACKGROUND OF THE INVENTION

1. Field of the Invention

An embodiment of the present specification relates to a wireless mobile communication system, and in particular, to a UE operation including a transmission power control procedure and a multiplexing procedure of the UE in a system where a device-to-device communication technology and a wireless cellular communication technology are used together, and to a base station operation corresponding thereto and an apparatus thereof.

2. Description of the Related Art

A device to device (D2D) communication technique which allows direct communication with another UE existing around the UE has emerged to provide a more efficient service using a wireless mobile communication system. A device to device communication technology may perform device to device communication through a discovery operation by a UE for discovering what kind of UEs are present around the UE and through a direct communication operation by the UE with a UE necessary for communication. As such, when the direct communication is performed by the device to device communication, a relatively small amount of wireless resource can be used in comparison with the communication using the conventional wireless network and a base station, and thus the wireless resource efficiency is improved. In addition, since a method for discovering UEs around the UE is supported, information required in accordance with the position of the UE and characteristics thereof can be provided to each UE, and thus new services such as an advertisement service, a Social Networking Service (hereinafter, referred to as SNS), etc. can be created and service efficiency thereby can be improved. Currently, a Long Term Evolution Advanced (hereinafter, LTE-A) system also requires support for the device to device technology and technical discussions therefor are under way.

The device to device communication may communicate using the same frequency band as does a conventional cellular communication which uses a base station. When the device to device communication uses the same frequency band as does the cellular communication, communication can be performed by dividing the communication on a time and frequency axis in order to solve a mutual interference problem. However, when a UE performs the conventional cellular communication, control information such as ACK/NACK, Scheduling Request (SR), Channel Quality Indicator (CQI), etc. can be periodically transmitted to the base station so that the frequency multiplexing may be required between the device to device communication and the cellular communication as well as multiplexing on a time axis. At this time, when the UE performing the device to device communication performs data transmission using an arbitrary transmission power, a problem may occur where in-band emission power thereby can provide a relatively larger noise impact to other UEs than the D2D UE which should receive the transmission. Thus, in a case where the device to device communication technology and the wireless communication technology are used together, in-band emission power due to the D2D signal transmission by the UE using the D2D technology in a system may cause a problem of noise in a cellular transmission, and thus the study for the situation is required.

SUMMARY OF THE INVENTION

The present invention is made to address the above-mentioned problem.

According to an embodiment of the present disclosure, provided is a method performed by a terminal in a communication system, the method including: receiving, from a base station, configuration information for one or more discovery resources, the configuration information including time and frequency resource information and threshold information for a reception signal power for each of the one or more discovery resources; measuring reception signal power in resources associated with discovery resources; selecting a discovery resource among the one or more discovery resources based on the measured reception signal power and the threshold information; and transmitting a discovery signal using the selected discovery resource.

According to another embodiment of the present disclosure, provided is a method performed by a base station in a communication system, the method including identifying one or more discovery resources and corresponding time and frequency resource and threshold information associated with a reception signal power for selecting a discovery resource for transmitting a discovery signal; and transmitting, to a terminal, configuration information for the one or more discovery resources, the configuration information including time and frequency resource information and threshold information for each of the one or more discovery resources, wherein the discovery resource is selected among the one or more discovery resources based on a measured reception signal power by the terminal and the threshold information, and According to a further embodiment of the present disclosure, a terminal in a communication system is provided, the terminal including a transceiver and a controller coupled with the transceiver. The controller is configured to receive, from a base station via the transceiver, configuration information for one or more discovery resources, the configuration information including time and frequency resource information and threshold information for a reception signal power for each of the one or more discovery resources, measure reception signal power in resources associated with discovery resources, select a discovery resource among the one or more discovery resources based on the measured reception signal power and the threshold information, and transmit a discovery signal using the selected discovery resource.

According to yet another embodiment of the present disclosure, a base station is provided in a communication system, the base station including a transceiver and a controller coupled with the transceiver. The controller is configured to identify one or more discovery resources and corresponding time and frequency resource and threshold information associated with a reception signal power for selecting a discovery resource for transmitting a discovery signal, and transmit, to a terminal via the transceiver, configuration information for the one or more discovery resources, the configuration information including time and frequency resource information and threshold information for each of the one or more discovery resources, wherein the discovery resource is selected among the one or more discovery resources based on a measured reception signal power by the terminal and the threshold information, and wherein the discovery signal is transmitted using the selected discovery resource.

BRIEF DESCRIPTION OF THE DRAWINGS

The above and other aspects, features and advantages of the present invention will be more apparent from the following detailed description in conjunction with the accompanying drawings, in which.

DETAILED DESCRIPTION OF EMBODIMENTS OF THE INVENTION

Figure 1:
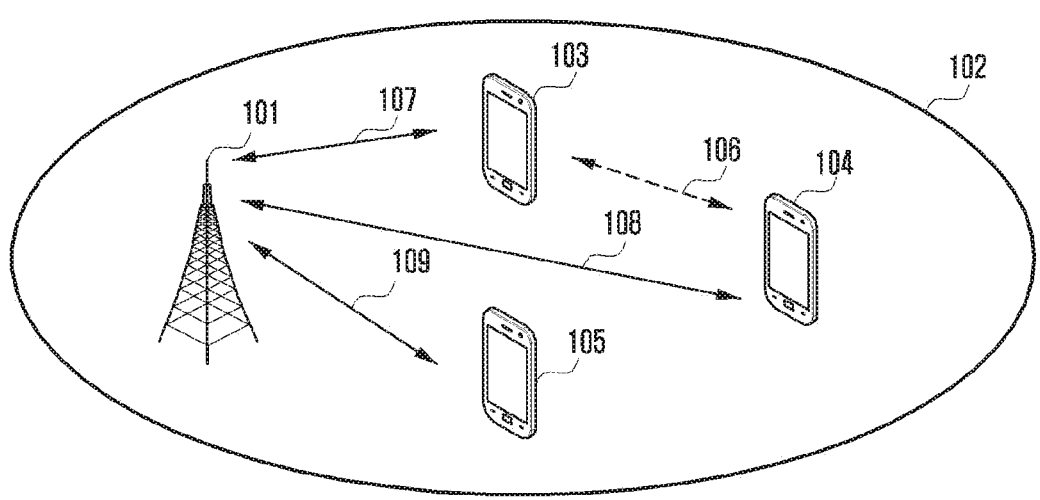
FIG. 1 is a diagram showing a state where device to device communication is supported in a wireless communication system according to an embodiment of the present invention.

Hereinafter, various embodiments of the present invention will be described in greater detail with reference to the accompanying drawings. In the following description of the present invention, a detailed description of known functions or configurations incorporated herein will be omitted when it may make the subject matter of the present invention rather unclear. The terms which will be described below are terms defined in consideration of the functions in the present disclosure, and may be different according to users, intentions of the users, or customs. Therefore, the definitions of the terms should be determined based on the contents throughout the specification.

In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present invention and ways to achieve them will be apparent by making reference to embodiments as described below in detail in conjunction with the accompanying drawings. However, the present invention is not limited to the embodiments set forth below, but may be implemented in various different forms. The following embodiments are provided only to completely disclose the present invention and inform those skilled in the art of the scope of the present invention, and the present invention is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

A method for controlling transmission power by a UE in a mobile communication system includes: receiving a signal including transmission resource allocation information and power control information from a base station; determining a signal transmission resource from which the UE is to transmit a signal based on the transmission resource allocation information; determining transmission power based on the power control information according to the position of the determined signal transmission resource; and transmitting the signal using the determined transmission power.

A method for supporting, by a base station, transmission power control of a UE in a mobile communication system according to another embodiment of the present specification includes: transmitting a signal including transmission resource allocation information and power control information to a UE; and receiving uplink transmission from the UE at a resource region determined according to the transmission resource allocation information, wherein the UE determines a signal transmission resource from which the UE is to transmit a signal based on the transmission resource allocation information, determines transmission power based on the power control information according to the position of the determined signal transmission resource, and transmits a signal using the determined transmission power.

In describing the exemplary embodiments of the present invention, descriptions related to technical contents which are well-known in the art to which the present invention pertains, and are not directly associated with the present invention, will be omitted. Such an omission of unnecessary descriptions is intended to prevent obscuring of the main idea of the present invention and more clearly transfer the main idea.

An embodiment of the present specification relates to a method and an apparatus for controlling transmission power by a UE in transmitting a device to device discovery signal by a UE between base stations in a wireless cellular communication system, and includes a method for configuring transmission power in order to minimize the impact of noise due to in-band emission of the UE and improve the performance of the UE discovery.

In addition, in describing embodiments of the present specification in detail, an Orthogonal Frequency Division Multiplexing (OFDM)-based wireless communication system, in particular, the 3GPP Evolved Universal Terrestrial Wireless Access (EUTRA) standard is regarded as a main subject. However, the main idea of the present specification can be applied also to any other communication system having a similar technical background and a channel shape with some modifications to the extent of not departing significantly from the scope of the present invention and the same can be possible by the decision of those skilled in the art of the present specification.

In embodiments of the present invention described below, a base station or a cell may imply the same meaning. Further, Device to Device (D2D) communication may be used as a meaning including all of a discovery operation for discovering adjacent User Equipments (UEs) and direct communication in which UEs directly exchange information.

FIG. 1 is a view showing a state where device to device communication (hereinafter referred to as D2D) is supported in a wireless communication system according to an embodiment of the present invention.

Referring to FIG. 1, a base station 101 governs UEs 103, 104, and 105 in a cell 102 which is governed by the base station 101 itself. That the base station 101 governs UEs 103, 104, and 105 may include providing a wireless service. The UE 105 may perform cellular communication with the base station 101 using a link 109 between the UE and the base station.

Further, the UEs 103 and 104 may perform cellular communication with the base station 101 using links 107 and 108 between the UE and the base station. In an embodiment, the cellular communication may include communication in which signals are transmitted and received between at least one among the base station and the UE.

When the D2D communication between the UE 103 and the UE 104 is possible, the UEs 103 and 104 may perform the discovery operation or the direct communication operation using a D2D link 106 without passing through the base station 101.

A D2D technology using a cellular wireless mobile communication system such as an LTE-A system can be supported in a direction not to cause problems including interference of a UE in basically performing communication using the conventional cellular system.

In an embodiment, a method for performing communication so as not to make interference between UEs which communicate using a D2D UE and a cellular system, includes a method for performing communication using a resource, for D2D communication, which is separate from and not overlapped with a wireless resource used by a cellular UE (a cellular UE of the present invention refers to a UE which includes a UE not performing device to device communication but performing the conventional UE to base station communication). On the other hand, considered is a method for the D2D UE which uses the same resources used by the cellular UE in a way to make as little interference as possible with each other.

A backward/forward duplexing method used by the LTE or LTE-A system includes a Frequency Division Duplexing (hereinafter referred to as FDD) method. The FDD may distinguish between forward transmission and backward transmission by using frequency resources different from each other. When a system using the FDD uses different resources for the D2D communication and the conventional cellular communication, backward frequency resources are more preferentially used for the D2D communication between forward and backward frequency resources in general. This is because many more types of signals are multiplexed to the forward frequency resources in comparison with the backward frequency resources. As a result, it is difficult to separately allocate the forward frequency resources for the purpose of the D2D communication in comparison with the backward frequency resources. Further, in the FDD system considering only the conventional cellular UE, forward traffic is larger than backward traffic due to the nature of a communication service and forwardly transmitted overheads are larger than backwardly transmitted overheads, so that using the frequency for the forward resources has a heavier burden in comparison with using the frequency for the backward resources. Accordingly, when the forward resources allocated for the purpose of the D2D communication are used, a burden of the forward resources becomes larger and thus it may be more difficult to adjust a balance between use of the forward and backward resources.

For the above reasons, an FDD communication system may use a reverse (directional) resource for D2D communication.

On the other hand, the above content is merely described as an advantage when using the reverse frequency resource as D2D resources, but it should be noted that forward frequency resources may be used for the D2D resources.

The next problem concerns a method for distinguishing between the conventional cellular communication resources and D2D communication resources. Division of conventional cellular communication resources and D2D communication resources can be performed through an orthogonal scheme such as Time Division Multiplexing (hereinafter referred to as TDM) and Frequency Division Multiplexing (hereinafter referred to as FDM), and additionally, the distinction between the conventional cellular communication resources and D2D communication resources is available through a non-orthogonal scheme reusing the same resource.

As described above, D2D communication can be supported in a way that the UE using the conventional cellular communication is not affected by problem so that an orthogonal scheme is preferred for at least a UE discovery operation. In addition, preferably, a TDM scheme is preferred among others for the UE discovery operation.

In an embodiment, the reason why the TDM scheme is preferred is that the base station does not have to receive a cellular signal at a duration allocated by the D2D resources, by using the TDM scheme, and on the other hand, the D2D transmission is not present during a duration in which the cellular communication is transmitted. Therefore, the D2D transmission can minimize the impact of noise, etc. when performing the cellular communication.

Figure 2:
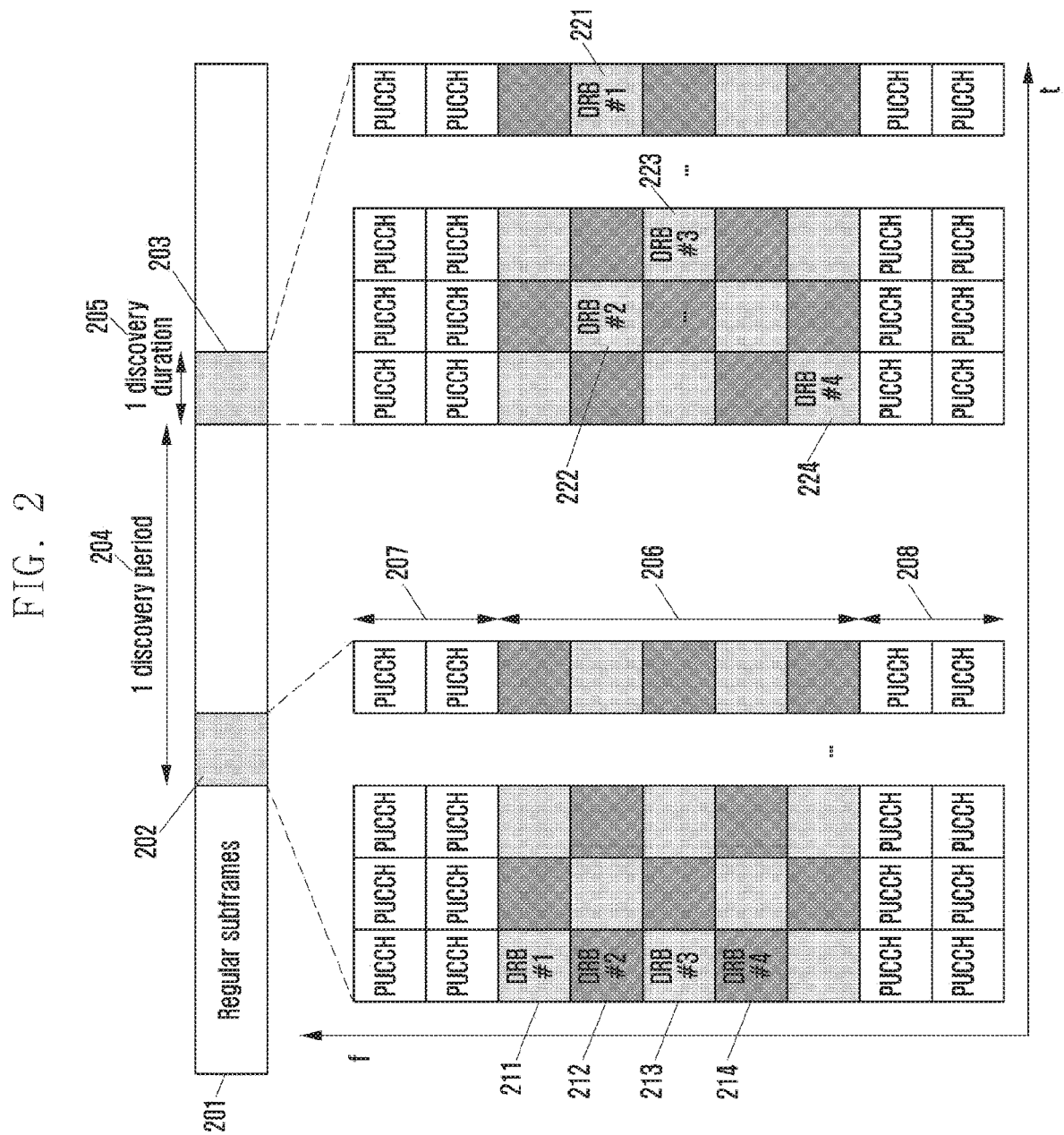
FIG. 2 is a diagram showing a state where D2D transmission and cellular transmission are multiplexed using a Time Division Multiplexing (TDM) scheme according to an embodiment of the present invention.

FIG. 2 is a diagram showing a state where D2D transmission and cellular transmission are multiplexed using a Time Division Multiplexing (TDM) scheme according to an embodiment of the present invention.

Referring to FIG. 2, reference numerals 201, 202, and 203 show that a cellular sub-frame and D2D sub-frame are time-based TDM.

The cellular communication can be configured for the duration of the reference numeral 201 and the D2D transmission can be configured for the durations of the reference numerals 202 and 203.

The durations of the reference numerals 202 and 203 can be referred as a discovery duration 205, and the period in which the discovery duration is generated can be referred as a discovery period 204.

Discovery signals are multiplexed in the discovery duration 205 including one or more reference numerals 202 and 203, and also a physical uplink control channels (PUCCHs) 207 and 208 of the cellular UE may be present in the discovery duration so as to transmit a response for Hybrid Automatic Retransmit reQuest (HARQ), Scheduling Request (SR), and Channel State Information (CSI) of the forward cellular communication. According to an embodiment, a PUCCH such as reference numeral 207 and 208 may be present at both ends of the frequency area in the discovery duration.

When discovery signals rather than the PUCCH in the discovery duration 205 are to be multiplexed, resources for a plurality of discovery signals from a section of reference numeral 206, that is, Discovery Resource Block (hereinafter DRB) can be multiplexed in a time-frequency domain. According to an embodiment, a DRB may be defined in a time-frequency unit of any size and may be multiplexed by forming a grid by a plurality of DRBs within the discovery duration such as reference numeral 206. For example, one DRB can be defined by one sub-frame and 12 sub-carriers (one RB), the same as a PRB. Any UE may transmit discovery signals thereof to a single DRB in the multiplexed DRB.

Meanwhile, according to an embodiment, a plurality of UEs may transmit the discovery signal to the single DRB. The UE may determine a DRB to transmit the discovery signal of the UE based on any rule or a predetermined rule, and any UE may transmit the discovery signal using the determined DRB.

For example, a UE 1 transmits a discovery signal of the UE 1 using a DRB of reference numeral 211, a UE 2 transmits a discovery signal of the UE 2 using a DRB of the reference numeral 212, a UE 3 transmits a discovery signal of the UE 3 using a DRB of reference numeral 213, and a UE 4 transmits a discovery signal of the UE 4 using a DRM of reference numeral 214. According to an embodiment, the correspondence between UEs and DRB may be relatively determined.

In an embodiment, when the UE 1 to UE 4 transmit discovery signals in the same time duration (same sub-frame), sometimes each UE may not receive the discovery signal from another UE. That is, the UE 1 may not receive the discovery signal from the UE 2 to UE 4, the UE 2 may not receive the discovery signal from the UE 1, UE 3, and UE 4, the UE 3 may not receive the discovery signal from the UE 1, UE 2, and UE 4, and the UE 4 may not receive the discovery signal from the UE 1 to UE 3. As such, in order to solve a problem of not receiving the discovery signal of the UEs for transmitting discovery signals in the same time duration, a time-frequency hopping method in which the location of the DRB varies in each discovery duration can be used.

In an embodiment, as shown by reference numerals 221 to 224, the positions of the DRB 1 to DRB 4 are different from the positions of the previous discovery durations, and thus the UE 1 to UE 4 may receive discovery signals from one another. As such, the DRBs are differently placed in different positions in time and frequency according to the discovery duration so that any UE may receive a discovery signal of another UE in the next discovery duration, and the discovery signal of another UE may not be received in the previous discovery duration. According to an embodiment, a time-frequency hopping method may be determined by one or more methods among a method configured in the UE and a method including a message, etc. received from a base station.

In the above, multiplexing between a D2D discovery signal and cellular transmission, multiplexing between discovery signal resources in discovery duration and a method of changing the position of the same DRB in accordance with the discovery duration were described. In the following, a problem due to in-band emission power in a D2D operation will be described.

In an embodiment, the UE transmits a discovery signal using one DRB, but when performing transmission in a full frequency band using any frequency block, in band other than the frequency block, a transmission power having a relative value with respect to the transmission power used in the frequency block may be generated. This is referred to as re-emission power.

That is, with reference to FIG. 2, when the UE 1 transmits the discovery signal of 23 dBm from the DRB1 211, −7 dBm power having, for example, 30 dB difference from the transmission power of the DRB1 may be generated in a DRB other than the DRB1 211 in the same sub-frame, and the generated power may result in acting as additional noise or interference to another UE which performs signal transmission and reception in the region. Hereinafter, the nature of in-band emission power will be described with reference to FIG. 3.

Figure 3:
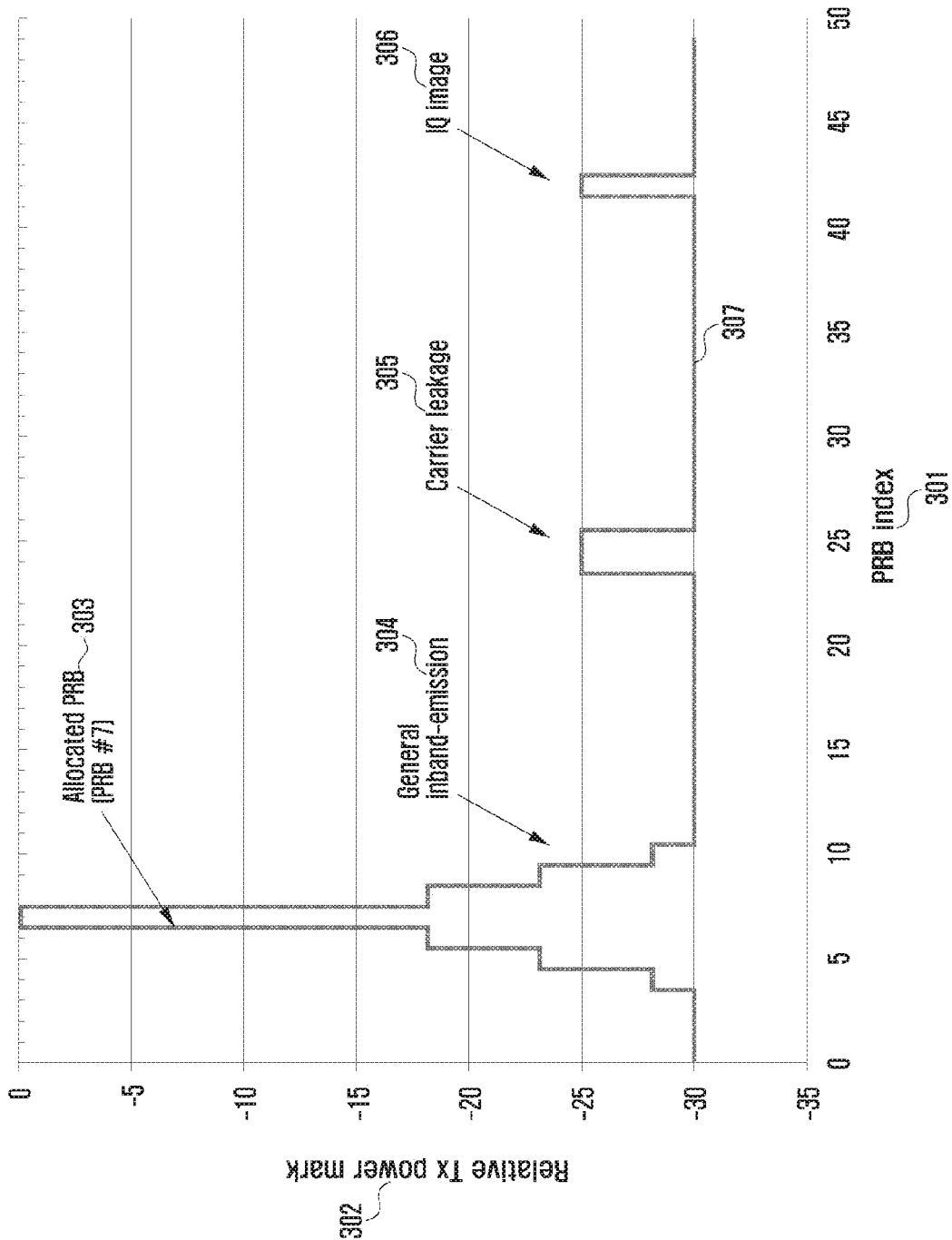
FIG. 3 is a diagram showing emission power when transmitting a signal by a UE according to the embodiment of the present invention.

FIG. 3 is a diagram showing emission power when transmitting a signal by a UE according to the embodiment of the present invention.

More specifically, FIG. 3 shows a method for generating an in-band emission power within a full band in an embodiment. Referring to FIG. 3, a diagram shows a smaller value than a value shown in the embodiment as the requirement of the in-band emission power. In a case where the power is applied in reality, the power may have the same in-band emission power as FIG. 3.

The horizontal axis 301 of FIG. 3 indicates PRB index, that is a frequency axis, and the vertical axis 302 indicates a magnitude of relative transmission power.

When transmitting data using any transmission power in PRB #7, as shown by reference numeral 303, which is a frequency allocated in the embodiment, −30 dB of transmission power is generated in the full band as shown by reference numeral 307, and to two or three PRBs near the allocated frequency, as shown by reference numeral 304, −30 dB or greater transmission power may be formed, and more specifically, transmission power may be generated in two or three PRBs adjacent to the allocated frequency in a stepwise manner.

In addition, as shown by reference numeral 305, additional emission power due to carrier leakage may be generated from at least one of PRB #24 and #25 positioned in the middle at the full band, and thus transmission power having a value greater than −30 dB may be generated.

In addition, an image frequency of the allocated frequency, as shown by frequency reference numeral 306, that is, additional transmission power due to IQ imbalance may be generated in a frequency in the symmetrical position relative to the intermediate frequency and thus transmission power greater than −30 dB may be generated. In an embodiment, since PRB #7 is an allocated frequency, additional emission power according to the IQ imbalance may be generated in PRB #42.

In an embodiment, when any UE transmits a discovery signal using any DRB, in-band emission power may also be generated in bands other than the band to which the DRB is transmitted, due to one or more of the above factors, and may affect discovery signals of other UEs, or affect the transmission performance of a PUCCH located near the discovery signal resource to be transmitted.

In other words, when the UE 103 and UE 104 of FIG. 1 transmit the discovery signal using any frequency resource 1, the UE 105 may transmit the PUCCH to the base station 101 using another frequency resource 2. At this time, when the distance between the UE 103 which transmits the discovery signal and the base station 101 is closer than the distance between UE 105 and the base station 101, the transmission loss of a signal transmitted to the base station 101 from the UE 103 may be smaller than the transmission loss of the UE 105.

Therefore, in a state where the base station 101 may receive a PUCCH signal of the UE 105 using a frequency resource 2, due to in-band emission power generated from the discovery signal transmitted by the UE 103 through a frequency resource 1 and a transmission loss difference, the reception power from the UE 103 may be greater than or similar to the PUCCH signal of the UE 105 received through the frequency resource 2. That is, the performance of the cellular UE may be deteriorated due to the D2D discovery operation.

Accordingly, in order to prevent performance degradation of the uplink control signal of the cellular UE, the transmission power control of the D2D UE, including the discovery signal transmission of the D2D UE, may be necessary. That is, in a case where the D2D UE is relatively closer to the base station, the D2D UE allows the transmission to use less power than defined transmission power. At this time, the transmission power when transmitting the discovery signal by the UE may be configured as a predetermined value such as a maximum transmission power of the UE, a value defined through signaling by a wireless network including a base station, a value configured in consideration of the transmission loss with the base station, and a value configured by the combination of the above methods.

For example, the transmission power of the D2D UE may be determined by equation (1) as follows:

$$Tx\_Power=\min\{Max\_Tx\_Power, f(D2D), g(PL)\} \quad (1)$$

In the above equation (1), Max_Tx_Power is the maximum available power of the transmission D2D UE, f(D2D) is transmission power, which is determined by the service type of the discovery signal transmitted by the UE, and g(PL) is transmission power determined according to a power loss (PL) between the base station and the UE. The g(PL) can be determined by equation (2) as follows:

$$g(PL)=Target\_Rx\_Power+PL \quad (2)$$

In the above equation (2), Target_Rx_Power is a target value of the reception power received, by the base station, from the UE. In addition, the transmission power of the UE may be configured by the above equation (2) by considering an offset value in consideration of carrier leakage.

As described above, when the transmission power is configured by the base station based on a target value of the reception power received from the UE and the transmission loss between the UE and the base station, the above problems can be solved.

However, when configuring the transmission power using a transmission loss between the UE and the base station as described above, a D2D UE at a closer distance with the base station may transmit a discovery signal thereof always using lower transmission power than the D2D UE which is relatively far from the base station. In other words, because the D2D UE which is adjacent to the base station as described above always transmits the discovery signal at a low transmission power, the coverage of the discovery signal is limited. Therefore, the UEs as described above have difficulty in performing a correct D2D discovery operation.

Therefore, an embodiment of the present specification proposes a method for reducing performance degradation and deterioration of the D2D communication performance, due to in-band emission power, through the transmission power control, and increasing the overall performance, and the method will be described with reference to examples.

Embodiment 1

A Periodic Discovery Signal Transmission Power Control Method

In order to mitigate PUCCH interference of a cellular UE due to in-band emission power, D2D UEs in close proximity to the base station as mentioned above, may transmit discovery signals thereof using lower transmission power through the power control. However, the power control method enables discovery signals thereof to be transmitted to specific D2D UEs as described above according to the position of the base station, using lower transmission power through the transmission power control for each discovery signal transmission so that D2D communication performance degradation due to the reduction of discovery signal transfer regions of the UEs may occur.

Therefore, in order to reduce the performance degradation of the D2D communication, a transmission power control operation may be performed, which is different from the transmission power control method which is periodically ($T_{PC}$) and previously used by the UEs. Here, the $T_{PC}$ is a period during which a separate power control operation is performed, which is different from the power control operation previously in use, and the previously used power control operation may be performed during the discovery signal transmission rather than the corresponding period. At this time, an operation of not performing transmission power for the discovery signal control may be included in the period. For convenience of explanation, the embodiment 1 describes that transmission power for the discovery signal control is not performed during the period.

That is, as mentioned above, for a UE in which transmission power for the discovery signal is reduced through a power control, the UE may periodically transmit a discovery signal thereof without power control for a cellular UE as the following equation (3).

$$Tx\_Power = \min\{Max\_Tx\_Power, f(D2D)\} \quad (3)$$

In the above equation (3), Max_Tx_Power is the maximum available power of the transmission D2D UE, and f(D2D) is the transmission power, which is determined by the service type of the discovery signal transmitted by the UE. At this time, the equation (3) is only a single example in which transmission power for the discovery signal is determined by the D2D UE, and there may be various methods of determining the transmission power for the discovery signal of the D2D UE.

In addition, the base station may perform power control using the reception power target values (Target_Rx_Power) of one or more base stations. In other words, the UE may perform the power control using Target_Rx_Power which is previously used in a predetermined power control period ($T_{PC}$) and other target reception power value Target_Rx_Power_$T_{PC}$. That is, in the transmission power control method for the discovery signal (Tx_Power=min{Max_Tx_Power, f(D2D), g(PL)}), for the power control period ($T_{PC}$), a Target_Rx_Power_$T_{PC}$ may be configured to be larger than Target_Rx_Power so that the transmission power for the discovery signal of the UE closer to the base station can be increased, as described above.

Here, a method for controlling the transmission power of the UE may be included by controlling other parameters required by the power control as well as by controlling the reception power target value of the base station.

At this time, the base station may inform of power control information such as the base station reception power target values in the configured power control period ($T_{PC}$) and the corresponding period to the UE by using at least one of System Information Black (SIB) signaling, higher layer signaling, and dynamic signaling. In addition, the UE may be aware of the value as determined in advance. Here, the power control period is an additional period for determining whether to perform an additional power control or a period used for the D2D UE such as the previously obtained period (for example, a discovery resource region re-discovery period). In addition, the period may be configured with the number of cellular UEs, the number of D2D UEs closer to the base station, the magnitude of a reception signal of the discovery signal transmission region measured by a base station, etc.

A UE having acquired the period may perform power control as defined in the period, or may perform power control defined by discovery signal transmission after a constant offset (X).

$$X = (UE\_ID \bmod T_{PC}))\} \quad (4)$$

In the above equation (4), UE_ID means a UE identification number. The above mentioned UE identification number is any one of possible IDs, and may include International Mobile Subscriber Identity (IMSI), Temporary Mobile Subscriber Identity (TMSI), Packet-Temporary Mobile Subscriber Identity (P-TMSI), Cell-Wireless Network Temporary Identifier (C-RNTI), and the like. In addition, the offset value may be determined by using other information having a UE-specific value as well as the UE identification number.

Figure 4:
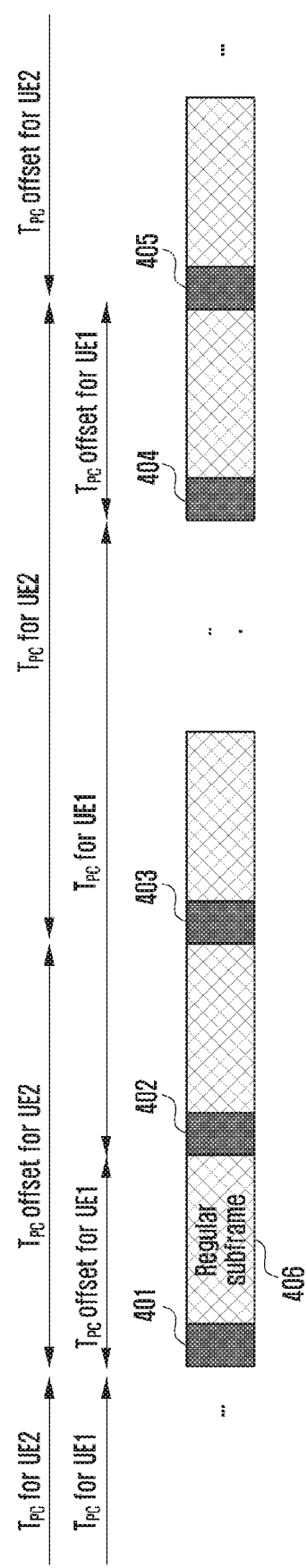
FIG. 4 is a diagram for explaining an operation of performing power control by a UE according to a UE transmission power for the discovery signal control period.

FIG. 4 is a diagram for explaining an operation of performing power control by a UE according to a discovery signal transmission power control period.

Referring to FIG. 4, a more detailed operation will be described as follows. The UE 1 and UE 2 which acquire the power control period (TPC) from the base station perform a power control operation according to the period, perform a previously used power control operation for discovery signal transmission during discovery signal transmission durations 401, 402, 403, 404, and 405, and performs, during a period corresponding to $T_{PC}$, a power control operation defined in the period.

For example, when defined so as not to perform power control during the period, both UE 1 and UE 2 which have reached a power control period ($T_{PC}$) during the duration 401 may transmit a discovery signal thereof without power control.

However, the UE 1 transmits a discovery signal after performing a previously used power control operation by the offset value of the UE-specific in the duration 401 and does not perform the power control in the duration 402. The UE 2, in the durations 401 and 402, transmits a discovery signal after performing a previously used power control operation as the operation in the duration 401 of the UE, and, in the duration 403, transmits the discovery signal without performing power control.

As described above, since D2D UEs closer to the base station may also transmit discovery signals thereof without considering a cellular UE during a particular discovery signal duration through embodiment 1, D2D performance degradation depending on the position of the UE can be prevented. Further, by dispersing the D2D UEs which perform power control using the $T_{PC}$ and the offset value as described above, in-band emission power effects on the cellular UE can be minimized.

Furthermore, in an embodiment, each UE may or may not perform power control in the corresponding period based on a power control performing period offset value. More specifically, it is possible to perform the control for reducing the transmission power in the conventional discovery signal transmission duration. In addition, a control for increasing the transmission power in the discovery signal transmission duration, during the time duration corresponding to the power control performing period offset value, may be performed, and in accordance with an embodiment, a control for reducing the transmission power in the discovery signal transmission duration, during the time duration corresponding to the power control performing period offset value, may not be performed.

Embodiment 2

A Discovery Signal Transmission Power Control Method According to a Discovery Resource Region In order to mitigate PUCCH interference of a cellular UE due to in-band emission power, D2D UEs in close proximity to the base station, as mentioned above, may transmit discovery signals thereof using lower transmission power through the power control. However, the above power control method enables discovery signals thereof to be transmitted to the specific D2D UEs according to the position of the base station, using lower transmission power through the transmission power control for each discovery signal transmission so that D2D communication performance degradation due to the reduction of discovery signal transfer region of the UEs may occur.

In order to solve the above problem, the base station allocates a duration in which power control is not performed for the discovery signal transmission in some resource regions among the D2D discovery signal resource regions. In other words, the base station separates the discovery signal resource region into one or more duration different each other and being operated so as to perform different power control for each duration to solve the above problem.

That is, the base station separates D2D resource regions by using one or more target received powers, or a signal-to-interference plus noise ratio requirement, and enables the UE to perform different transmission power control operations for each resource region to solve the problem.

The UE may transmit discovery signal thereof using the D2D resource region allocated for D2D communication by the base station, and receive discovery signals transmitted by adjacent UEs. At this time, the UE may select any one or a plurality of resources among the D2D resource region and transmit a discovery signal thereof. On the other hand, the UE may measure the reception signal strength of all of the D2D resources or some of the D2D resource regions, select a resource having the lowest signal strength and transmit the discovery signal thereof, and select any one among a resource candidate groups having low reception signal strength.

In some cases, a UE for transmitting a discovery signal according to an embodiment may transmit the discovery signal in time or may not receive the discovery signal from the another UE in time. Therefore, the UE may select any resource for each discovery signal transmission period or select a different discovery resource for each discovery signal transmission period using a predefined pattern (e.g., time-frequency hopping) to transmit the discovery signal.

Therefore, the UE may use different discovery signal resources for each discovery signal transmission period so that the above problem can be addressed. That is, when the base station separates the D2D discovery signal resource regions into one or more regions, and enables each of the UEs to perform different power control operations in each region, the UEs may perform a different power control operation for each discovery signal transmission period. For example, the D2D discovery resource region configured by one or more sub-frames may be separated into one or more sub-frame sets, and a different transmission power control method for each sub-frame set may be used.

At this time, the base station may use the reception signal strength requirement or the signal-to-interference-noise ratio requirement received from the UE to perform different power control operations for each sub-frame. At this time, not performing a separate power control operation for the cellular UE may be a method for a power control operation.

That is, the UE may perform a discovery signal transmission power control operation according to the power control corresponding to a discovery resource region determined for each discovery signal transmission period.

Figure 5:
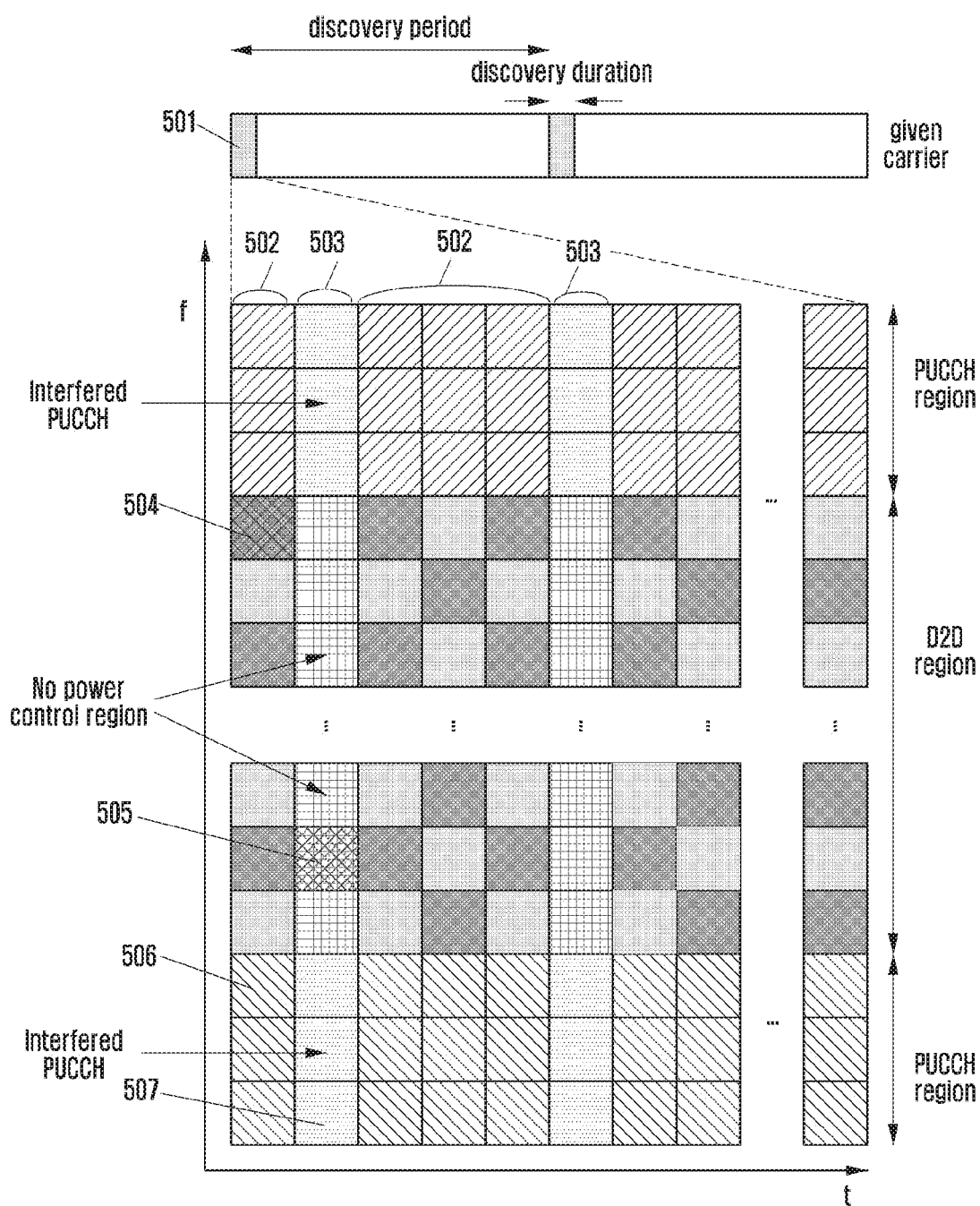
FIG. 5 is a diagram for explaining a power control operation by a UE for a discovery resource region divided according to two transmission power control methods different from each other.

FIG. 5 is a diagram for explaining a power control operation by a UE for a discovery resource region separated according to two transmission power control methods which are different from each other.

Referring to FIG. 5, from the perspective of the UE, a more specific power control operation by the UE is described as follows. In an embodiment, the base station may perform one or more different power controls on resource regions of reference numerals 502 and 503, for example, by separating a D2D discovery signal transmission area 501. For example, reference numeral 502 is a region for performing, by the UE, the discovery signal transmission power control operation for the cellular UE, and reference numeral 503 is a region for not performing, by the UE, the discovery signal transmission power control operation for a cellular UE.

In FIG. 5, for the convenience of explanation, the area was separated into regions 502 for performing the power control operation for the cellular UE and region 503 with no power control. In the control method according to the embodiment, reference numeral 503 may include at least one of no power control and performing a power control operation different from the reference numeral 502. In other words, the discovery resource area division according to the power control is to distinguish the performance of one or more different power control operations by the UE, and no power control is also a part of the power control operation.

When the UE selects its own discovery signal transmission resource area 504 in FIG. 5, the discovery signal of the UE is transmitted according to the transmission power control method of the power control region 502. When the UE uses the region of the reference numeral 505 as its own discovery signal transmission resource, the discovery signal of the UE is transmitted according to the transmission power control method of the power control region 503.

As shown in FIG. 5, when not performing transmission power control for the cellular UE in the region 503, the UE may transmit a discovery signal without performing a separate transmission power control operation for the cellular UE. Throughout the embodiment, the transmitting of the discovery signal by the UE without performing a separate transmission power control operation may include transmitting the discovery signal by the UE with a maximum transmission power or power close thereto.

Through the above method, when the region for performing power control as shown in the region 502 of FIG. 5 is to be selected for discovery signal transmission resource, a D2D UE adjacent to the base station, according to a discovery signal resource region-specific transmission power control method by the base station, may perform power control in order to minimize interference to a PUCCH region 506 of the UE for performing cellular communication, and when there is no power control region as shown in the region 503 of FIG. 5, may transmit a signal while performing power control for the PUCCH. Thus, unlike the conventional power control method, since the D2D UE adjacent to the base station is not always performing power control, the discovery signal performance degradation of the D2D UE can be reduced.

In addition, since the duration such as reference numeral 503 is a region in which the base station configures the power control information according to its own state, the cellular UE may be aware that the performance of the cellular UE will be degraded in the resource region 507 in which a control signal is transmitted by the cellular UE. Therefore, the base station may control the cellular UE so as not to use the region or minimally use the region through the scheduling and resource allocation, etc. That is, the base station may configure the operation of the cellular UEs on the regions by using information on the performance difference between the cellular UEs in the regions of reference numerals 506 and 507.

At this time, the power control information for each discovery signal resource region and a corresponding region may be informed of to the UE, by the base station, through a System Information Block (SIB), or the downlink control channel, higher layer signaling, and dynamic signaling. In addition, the UEs may be aware of the information as a value determined in advance. At this time, the information may include position (for example, time, frequency) information on the divided discovery signal resource duration and information and power control-related parameters for each duration.

Embodiment 3

Method for Selecting a Discovery Signal Resource According to the Position of a UE In order to mitigate PUCCH interference of a cellular UE due to in-band emission power, D2D UEs in close proximity to the base station as mentioned above, may transmit discovery signals thereof using lower transmission power through the power control. However, the above power control method enables discovery signals thereof to be transmitted to the specific D2D UEs according to the position of the base station, using lower transmission power through the transmission power control for each discovery signal transmission so that D2D communication performance degradation due to the reduction of discovery signal transfer region of the UEs may occur.

In order to solve the problem as described above, the base station may divide the D2D discovery resource region into one or more regions based on a predetermined criteria (e.g., based on a reception power of the discovery signal from the base station or based on the position of a UE) and the D2D discovery resource region can be divided into one or more regions. At this time, the UE enables the discovery signal thereof to be transmitted within the discovery signal region corresponding to the UE from among the reference regions configured by the base station so that the problem can be solved.

More specifically, the base station may measure reception power for the discovery signal received from the D2D UE and divide the D2D discovery resource into one or more regions. For example, the base station may divide the D2D discovery resource into two regions based on reception power XdBm for the discovery signals of the D2D UEs received by the base station. At this time, a reference may be configured by one of various measurement values including a transmission path loss value between the base station and the UE, Signal-to-Noise Ratio (SNR) or Signal-to-Interference plus Noise Ratio (SINR) as well as reception signal strength of the base station. Further, a reference value may be configured as a value capable of minimizing the PUCCH performance deterioration of the cellular UE including the discovery signal transmission by the D2D UE.

The reception power for discovery signals by D2D UEs of the base station may be used as the basis for the position of the D2D UE. That is, when the base station notifies a reference of the reception power from the D2D UEs to other UEs, the other UEs may predict the reception power of the base station on the discovery signal transmission by the UE, using a path loss value with the base station and the discovery signal transmission power. That is, since the base station adjacent to the UE has a relatively small path loss value, it is difficult to satisfy a requirement of the base station. In other words, reception power of the discovery signals of the D2D UEs may be interpreted as reference values for the location of the UEs. The requirement may be determined based on the magnitude of the reception power measured when the discovery signal transmitted by the UE is received at the base station.

The reference value and the area for the control information may be notified of to the UE by the base station through the System Information Block (SIB), the downlink control channel, the higher layer signaling, or the dynamic signaling. In addition, the UEs may be aware of the information as a value determined in advance. At this time, the information may include position (e.g., time and frequency) information on the divided discovery signal resource duration.

The UE which has acquired the reference value may predict the magnitude of the discovery signal thereof received at the base station, by using the measured channel value such as path loss information between the base station and the UE, and a transmission power value of the discovery signal. Therefore, the UE may compare the information with reference information configured by the base station to know its own discovery signal transmittable region.

The UE having acquired the discovery signal transmittable region may select its own discovery signal from among one or more regions which transmits the discovery signal. At this time, the UE may select any one resource or a plurality of resources among the discovery signal transmittable region and transmit the discovery signal of the UE. On the other hand, the UE may measure the reception signal strength of all of the D2D resources or some of the D2D resource region, select a resource having the lowest signal strength and transmit the discovery signal thereof, and select any one among a resource candidate group having low reception signal strength. However, in some cases, a UE for transmitting a discovery signal according to an embodiment may not transmit the discovery signal or may not receive the discovery signal from the other UE in time. Therefore, the UE may select any resource for each discovery signal transmission period, or select discovery resources different from each other among the discovery signal transmittable region for each discovery signal transmission period using a predefined pattern (e.g., time-frequency hopping) to transmit the discovery signal. At this time, when changing the discovery signal transmission resource using a pre-defined pattern, the time-frequency hopping pattern may be formed according to the same discovery signal transmitted area.

As described above, the base station operates the D2D discovery resource region by dividing the discovery signal transmittable area using a predetermined reference so that the base station may predict an influence from the D2D UE. For example, the D2D discovery resource region configured by one or more sub-frames may be divided into one or more sub-frames set so that D2D UEs adjacent to the base station and D2D UEs far from the base station may transmit a discovery signal in the sub-frames set different from each other. Therefore, the base station may know in advance the information that the performance of the cellular UE will be degraded due to the interference caused by the discovery signal, in the resource region of a sub-frame set for transmitting the discovery signal by the D2D UE close to the base station. At this time, the base station may control the cellular UE so as not to use the region or minimally use the region through the scheduling and resource allocation, etc. That is, the base station may configure the operation of the cellular UEs on the regions by using information on the performance difference between the cellular UEs in the regions divided by the reference.

Figure 6:
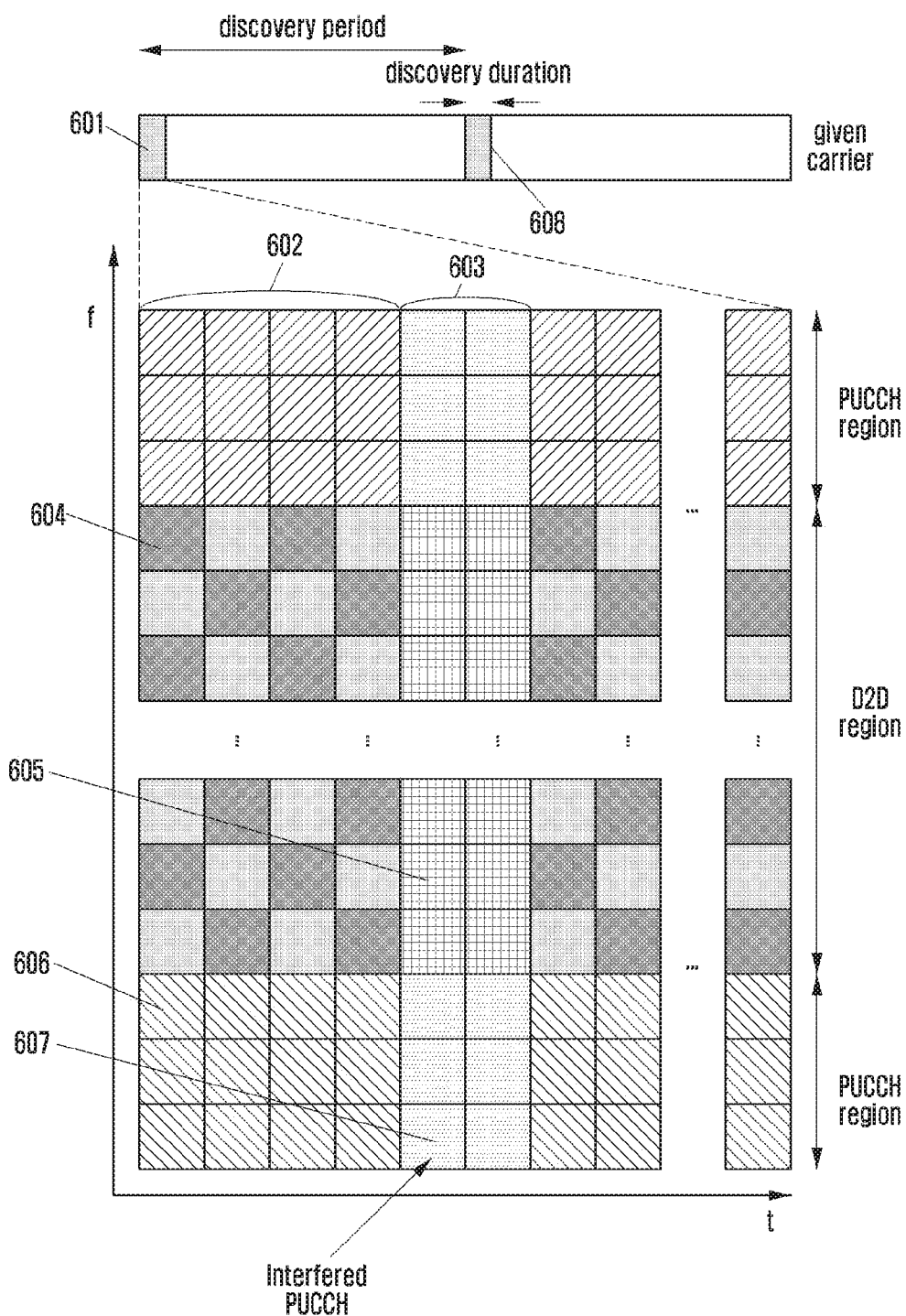
FIG. 6 is a diagram for explaining a power control operation by a UE for a discovery resource region which is divided based on the position of a UE.

FIG. 6 is a diagram for explaining a power control operation by a UE for a discovery resource region which is divided based on the position of a UE.

Referring to FIG. 6, from the perspective of the UE, a more specific power control operation by the UE will be described as follows.

In an embodiment, the base station may divide the D2D discovery signal transmission area 601 based on the reference on the position of one or more UEs, such as regions 602 and 603. For example, the reference numeral 602 is a region for performing the discovery signal transmission by a UE of which a distance between the base station and the UE is farther than the reference point, and the reference numeral 603 is a region for performing the discovery signal transmission by a UE of which a distance between the base station and the UE is closer than the reference point. In the embodiment, the discovery resource region is divided based on the location of the UE for convenience of explanation, however information capable being received or measured from the UE by the base station, such as the discovery signal strength of a D2D UE received from the base station, can be used as a reference or measured. In an embodiment, a distance between the base station and the UE may be determined based on a channel state between the base station and the UE.

In FIG. 6, a UE, which determines that a distance from the base station is farther than a configured reference point, selects a discovery signal transmission resource thereof in a remaining region 602 except for a region indicated by reference numeral 603. For example, the UE selects a region of the reference numeral 604 within the region of reference numeral 602 and transmits the discovery signal thereof. However, a UE, which determines that a distance from the base station is closer than a configured reference point, selects discovery signal transmission resource thereof in a remaining region 603 except for a region indicated by reference numeral 602. For example, the UE selects a region of the reference numeral 605 within the region of reference numeral 603 and transmits the discovery signal thereof.

At this time, when performing the discovery signal transmission using a pre-defined pattern (time-frequency hopping), the UE, which has performed the discovery signal transmission in one region among the region 602 of the D2D discovery signal transmission duration 601, may be defined so as to select one of the discovery signal regions corresponding to the reference, such as 602, in a D2D discovery signal transmission duration 608. In addition, the UE, which has performed the discovery signal transmission in one region among the region 603 of the D2D discovery signal transmission duration 601, should be defined so as to select one of the discovery signal regions corresponding to the reference, such as 603, in the D2D discovery signal transmission duration 608. In other words, the time-frequency hopping pattern may be defined such that one of the discovery signal resources within the same divided region is selected for each D2D discovery signal transmission duration.

Through the above mentioned method, since only the D2D UEs, which are farther from the base station according to the reference point configured by the base station, may transmit the discovery signal in the region 602, the impact on a PUCCH region 606 of the UE for performing the cellular communication can be minimized. However, since D2D UEs relatively closer to the base station, in the duration such as the region 603, may transmit the discovery signal, the performance of a PUCCH region 607 of the UE for performing the cellular communication can be degraded. However, the base station may know in advance the information that the performance of the cellular UE in the region 607 will be degraded according to the reference point configuration. Therefore, the base station may control the cellular UE so as not to use the region or minimally use the region through the scheduling and resource allocation, etc. so that the impact on the cellular UE can be minimized.

Embodiment 4

A Discovery Signal Transmission Power Control Method According to a Discovery Signal Transmission Resource Region In order to mitigate PUCCH interference of a cellular UE due to in-band emission power, D2D UEs in close proximity to the base station as mentioned above, may transmit discovery signals thereof using transmission power lower than the maximum transmitted power through the power control. However, the power control method as described above allows discovery signals to be transmitted to specific D2D UEs according to the position of the base station, using lower transmission power for each discovery signal transmission through the transmission power control so that D2D communication performance degradation of the UEs may occur.

In order to solve the problem, the base station may notify of discovery signal transmission power control information in each D2D sub-frame, using a downlink control channel to the UE. Thus, the base station may solve the problem by being able to dynamically control the transmission power for the discovery signal of the D2D UE area according to the PUCCH transmission of a cellular UE.

More specifically, the base station may configure, in each discovery signal transmission area, transmission power control information on discovery signal transmission areas of the D2D UEs according to the information on the cellular UE. That is, when there is no PUCCH transmission by the cellular UE in some of the sub-frame among the discovery signal transmission area, at that time, the base station UE may notify using a downlink control channel that the D2D UE may transmit a discovery signal using a transmittable power without considering the cellular UE.

In addition, when there is PUCCH transmission by the cellular UE in some sub-frames of the discovery signal transmission area, the base station may control the discovery signal transmission power of the D2D UE to minimize the impact on the cellular UE.

The base station may configure transmission power control information for the discovery signal transmission area to the UE, using a downlink control channel such as a new Downlink Control Information (DCI) format for the D2D. The DCI format may include other information for D2D UEs such as the information on the discovery signals of the D2D UEs as well as the discovery signal transmission power control information.

Figure 7:
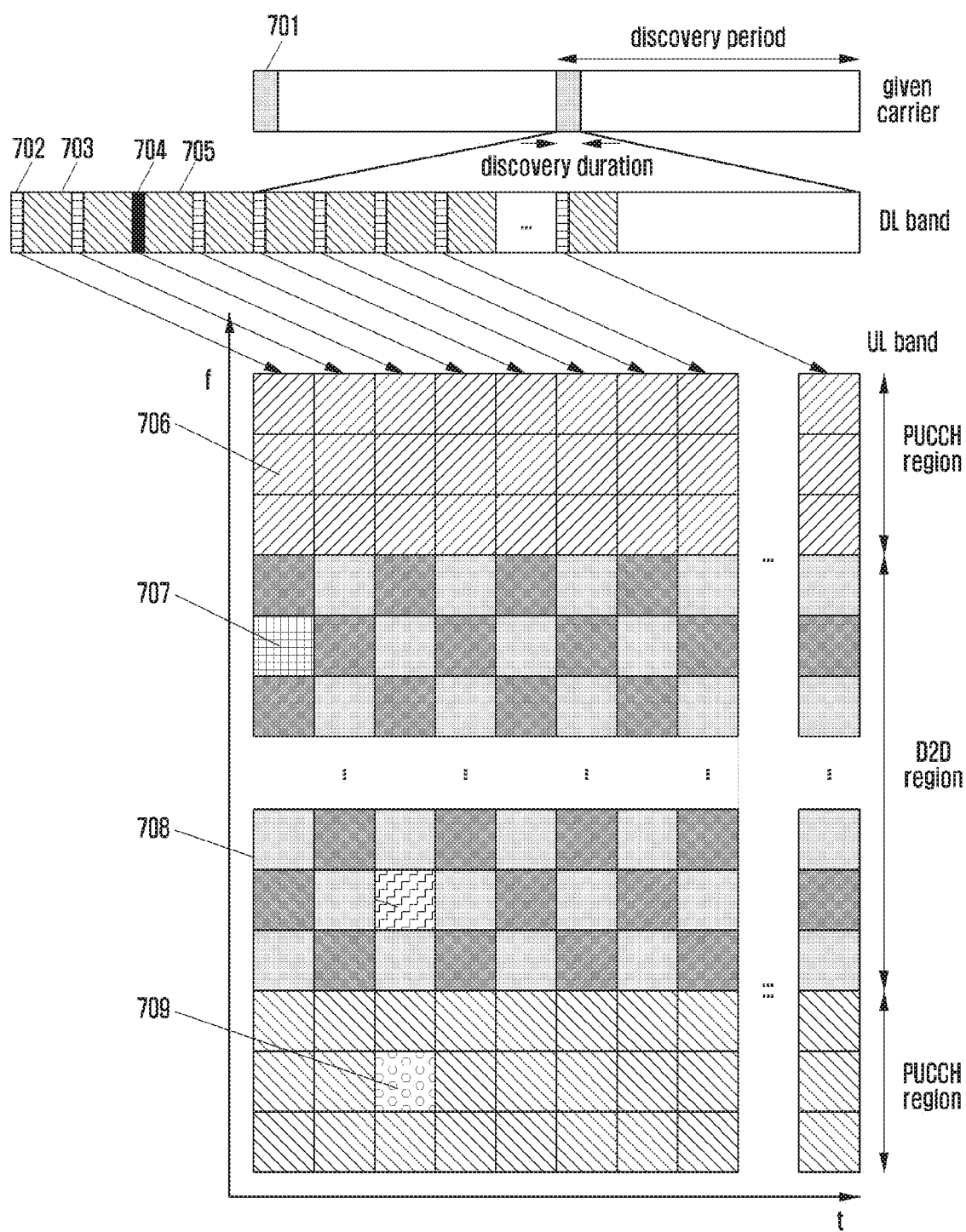
FIG. 7 is a diagram explaining an operation of controlling, by a base station, a transmission power for the discovery signal of a UE for downlink control channel information.

FIG. 7 is a diagram explaining an operation of controlling, by a base station, a discovery signal transmission power of a UE for downlink control channel information.

Referring to FIG. 7, from the perspective of the UE, a more specific power control operation by the UE is described as follows.

In an embodiment, a D2D discovery signal transmission area 701 of the base station may include a plurality of sub-frames. At this time, a sub-frame may be formed of a control signal transmission section 702 and a data signal transmission section 703. Therefore, the base station may control the transmission power of the D2D UE through transmitting a control signal in each sub-frame of the area 701. For example, in the sub-frame including reference numerals 702 and 703, when it is determined that there is no PUCCH transmission of the cellular UE or that PUCCH performance deterioration of the cellular UE is small, the base station enables the UE to perform a power control on the sub-frame without considering the cellular UE through control signal transmission of the reference numeral 702. At this time, the UE may select a discovery resource in a reference numeral 707 region and transmit the discovery signal without a separate power control for the cellular UE. However, when PUCCH transmission of the cellular UE is performed in the sub-frame configured by reference numerals 704 and 705, the base station enables the UE to perform power control in consideration of the cellular UE in the sub-frame through control signal transmission of the reference numeral 704. Therefore, the UE may select a discovery resource in a reference numeral 708 region and transmit the discovery signal after performing a power control operation for the cellular UE.

At this time, the control information signal may include additional information (for example, discovery signal transmission resource area) on the discovery signal transmission, including a configuration value for the power control of the D2D UE.

Through the method as described above, since the D2D UE may control discovery signal power according to the configuration of the discovery signal power control of the base station, the impact on the PUCCH regions 706 and 709 of the UE for performing cellular communication can be minimized. In addition, for a UE adjacent to the base station, since the discovery signal can be transmitted without any additional power control according to the power control setting for the base station, a problem of the performance deterioration due to the power control operation for a cellular UE can be solved.

Figure 8:
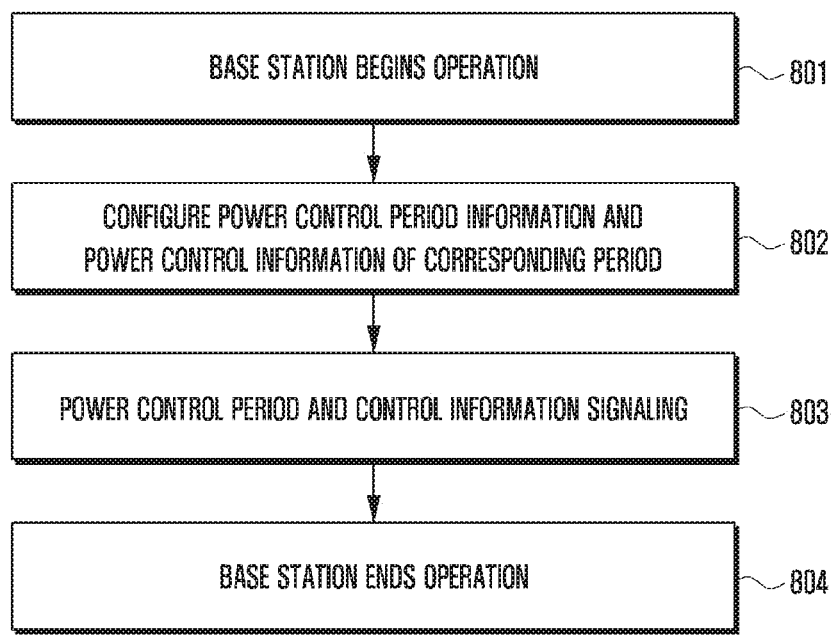
FIG. 8 is a flow chart illustrating an operation of a base station according to a first embodiment of the present invention.

FIG. 8 is a flow chart illustrating an operation of a base station according to a first embodiment of the present invention.

Referring to FIG. 8, in step 801, the base station begins an operation.

In step 802, the base station may set power control period information and power control information on the period. According to an embodiment, the power control period information may include at least one of a period value for performing power control and offset information. In addition, the power control information may include a value that is the basis for controlling transmission power for transmitting a discovery signal by the UE.

In step 803, the base station may signal, to the UE, the configured power control period and power control information. More specifically, the base station may signal the configured power period information through at least one of SIB signaling, RRC signaling, and dynamic signaling to the UE.

In step 804, the base station ends the operation.

Figure 9:
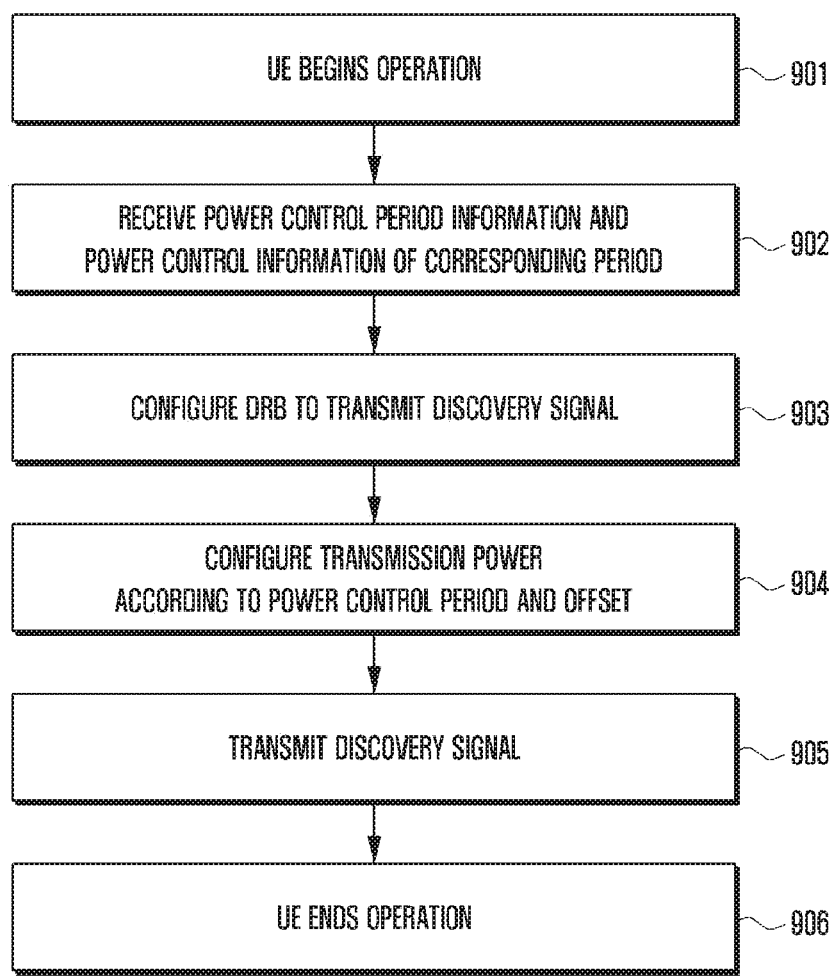
FIG. 9 is a flow chart illustrating an operation of a UE according to a first embodiment of the present invention.

FIG. 9 is a flow chart illustrating an operation of a UE according to a first embodiment of the present invention.

Referring to FIG. 9, in step 901, the UE begins an operation.

In step 902, the UE may receive a power control period and power control information on the period from a base station. Step 902 may be selectively performed according to an embodiment, and when the step 902 is not performed, the UE may use the configured information without receiving the power control information from the base station.

In step 903, the UE configures a DRB for transmitting a discovery signal thereof in any discovery duration. The DRB configuration may be determined according to the DRB position determined by the UE or the base station, and the position of each transmission DRB may be different depending on the application of the frequency hopping.

In step 904, the UE sets a power control period offset according to the configured DRB and power control period and sets a reference power by using the power control information in the period. The power control period offset information may be determined according to information received in step 902 or a preconfigured UE information.

In step 905, the UE performs a discovery signal transmission by using the configured transmission power.

In step 906, the UE ends the operation.

Figure 10:
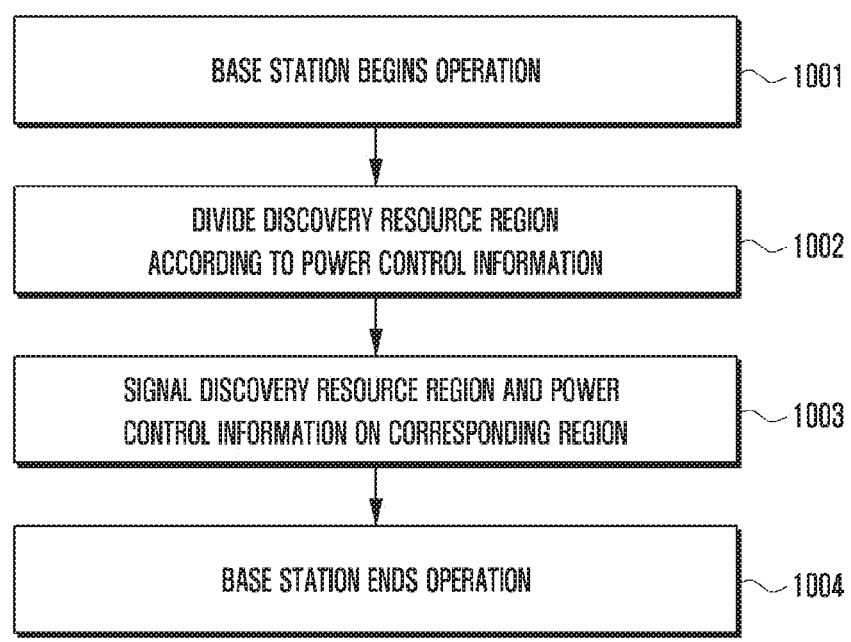
FIG. 10 is a flow chart illustrating an operation of a base station according to a second embodiment of the present invention.

FIG. 10 is a flow chart illustrating an operation of a base station according to a second embodiment of the present invention.

Referring to FIG. 10, in step 1001, the base station begins an operation.

In step 1002, the base station may divide and configure the discovery resource region according to the power control information.

In step 1003, the base station may signal, to the UE, at least one of information on the configured discovery resource region and power control information on the region. More specifically, the base station may signal, to the UE, the configured power control information through at least one of SIB signaling, RRC signaling, and dynamic signaling.

In step 1004, the base station ends the operation.

Figure 11:
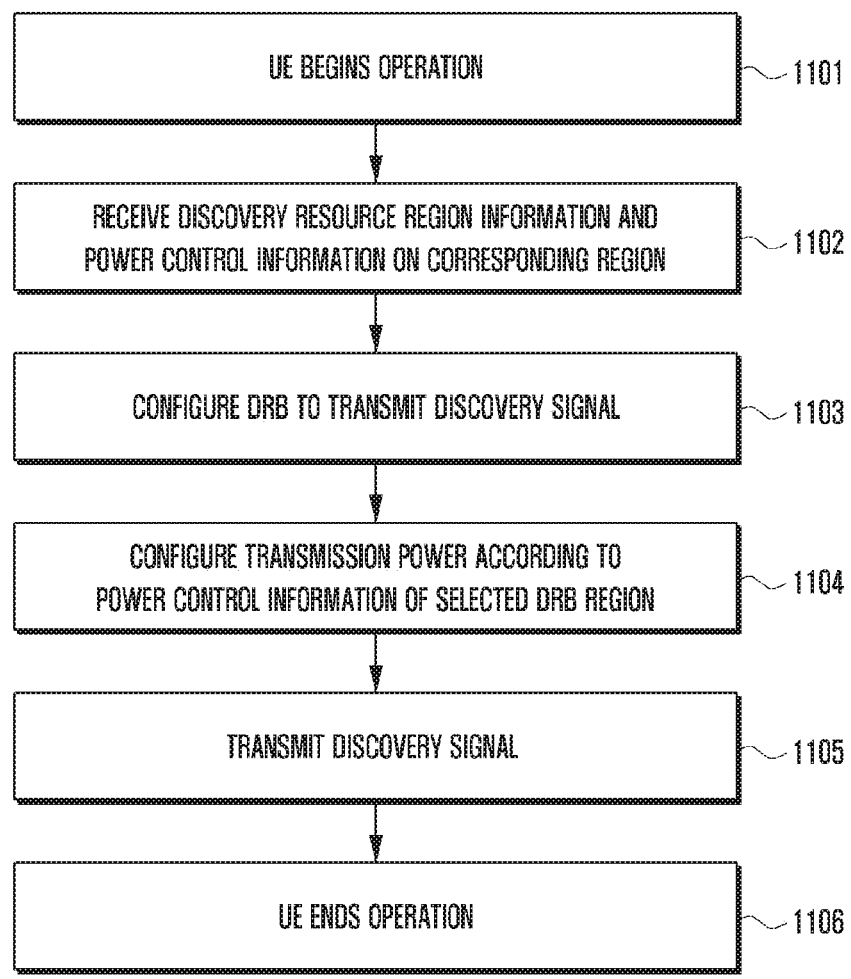
FIG. 11 is a flow chart illustrating an operation of a UE according to a second embodiment of the present invention.

FIG. 11 is a flow chart illustrating an operation of a UE according to a second embodiment of the present invention.

Referring to FIG. 11, in step 1101, the UE begins an operation.

In step 1102, the UE may receive discovery resource region information and power control information for each region from the base station. In an embodiment, the discovery resource region information includes discovery resource transmission region information having different power control information performed therein. In addition, the power control information may include the power control information performed in each discovery resource transmission region.

Step 1102 may be selectively performed according to an embodiment, and when the step 1102 is not performed, the UE may use the configured information without receiving the power control information from the base station.

In step 1103, the UE configures a DRB for transmitting a discovery signal thereof in a discovery duration region. The DRB configuration may be determined according to the DRB position determined by the UE or the base station, and the position of each transmission DRB may be different depending on the application of the frequency hopping.

In step 1104, the UE sets the transmission power using the power control information according to the configured DRB region.

In step 1105, the UE performs a discovery signal transmission by using the configured transmission power.

In step 1106, the UE ends the operation.

Figure 12:
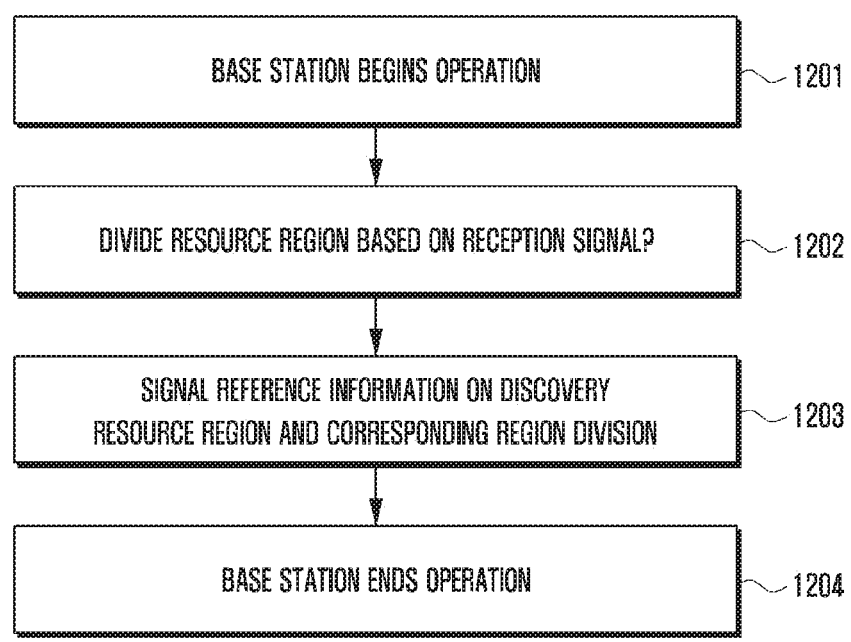
FIG. 12 is a flow chart illustrating an operation of a base station according to a third embodiment of the present invention.

FIG. 12 is a flow chart illustrating an operation of a base station according to a third embodiment of the present invention.

Referring to FIG. 12, in step 1201, the base station begins an operation.

In step 1202, the base station may divide a discovery resource region according to a reference of a reception signal or a reference on a UE position, and configure a discovery resource transmission region. According to an embodiment, the UE location may be determined based on one or more of the magnitude of the reception power for receiving a signal transmitted by the UE, path loss, and an SINR value.

In step 1203, the base station may signal, to the UE, the configured discovery resource region information and region dividing reference information. More particularly, the base station may signal to the UE through at least one among SIB signaling, RRC signaling, and dynamic signaling. The region dividing reference information according to an embodiment may include a basis for selecting, by the UE, the discovery signal transmission region resource for a specific region according to the embodiment.

In step 1204, the base station ends the operation.

Figure 13:
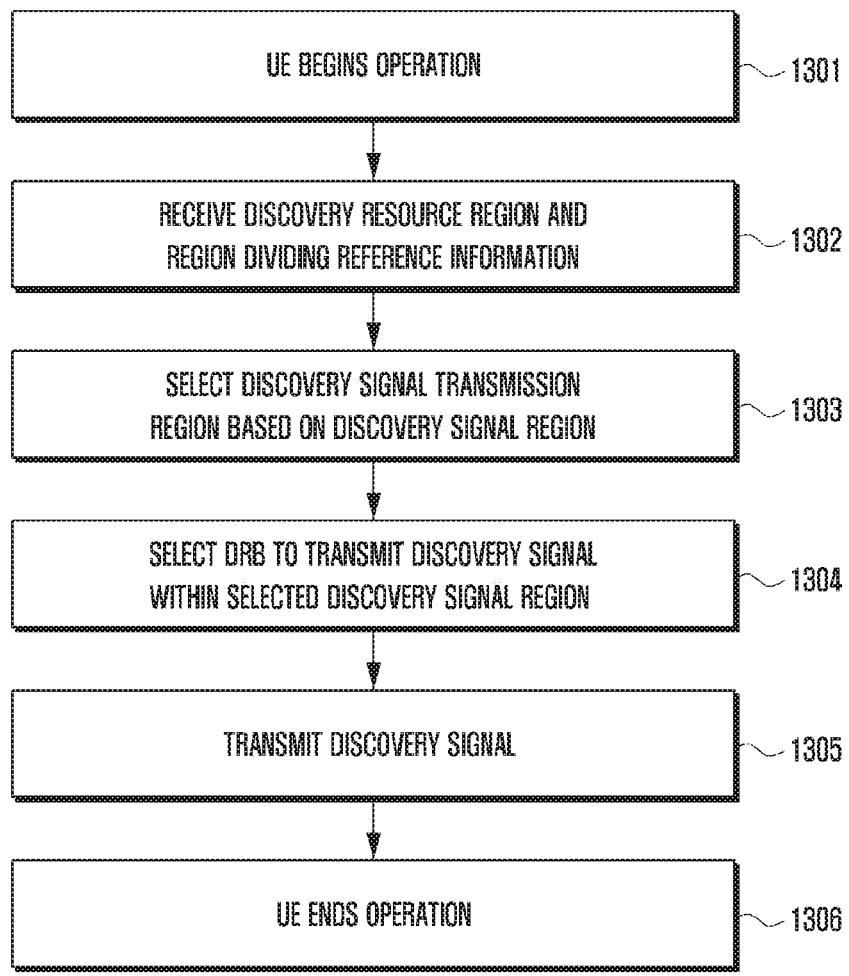
FIG. 13 is a flow chart illustrating an operation of a UE according to a third embodiment of the present invention.

FIG. 13 is a flow chart illustrating an operation of a UE according to a third embodiment of the present invention.

Referring to FIG. 13, in step 1301, the UE begins an operation.

In step 1302, the UE may receive a discovery resource region and the region dividing reference information from the base station. The step 1302 may be selectively performed according to an embodiment, and when the step 1302 is not performed, the UE may use pre-configured information. The reference information for dividing the region according to an embodiment may include a basis for selecting, by the UE, the discovery signal transmission region resource for a specific region according to the embodiment.

In step 1303, the UE selects a discovery signal transmittable area thereof based on the received reference signal region.

In step 1304, the UE configures a DRB for transmitting a discovery signal thereof among the discovery signal transmittable region. The configuration of the DRB may be determined according to the determination of the DRM position by the UE or the base station, the position of each transmission DRB may be different depending on the application of the time-frequency hopping, but at this time, the time-frequency hopping is performed within the discovery signal transmission region selected in step 1303.

In step 1305, the UE transmits the discovery signal by using the configured DRB region.

In step 1306, the UE ends the operation.

Figure 14:
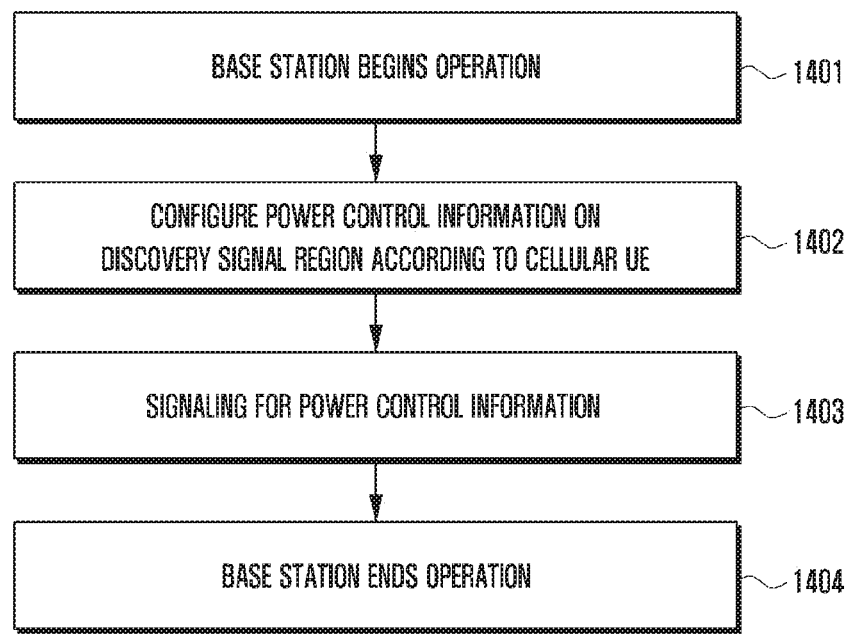
FIG. 14 is a flow chart illustrating an operation of a base station according to a fourth embodiment of the present invention.

FIG. 14 is a flow chart illustrating an operation of a base station according to a fourth embodiment of the present invention.

Referring to FIG. 14, in step 1401, the base station begins an operation.

In step 1402, the base station may configure the power control information for the D2D signal transmission region according to the cellular UE. In an embodiment, the D2D UE may configure power control information for the discovery signal region determined based on the influence of a cellular UE in the UE, according to the discovery signal in the resource region for transmitting the discovery signal. According to an embodiment, the power control information for the discovery signal region may include at least one of a method for controlling transmission power and a value of the transmission power in a specific resource region.

In step 1403, the base station signals the configured discovery resource region and power control information on the region to the UE.

In step 1404, the base station ends the operation.

Figure 15:
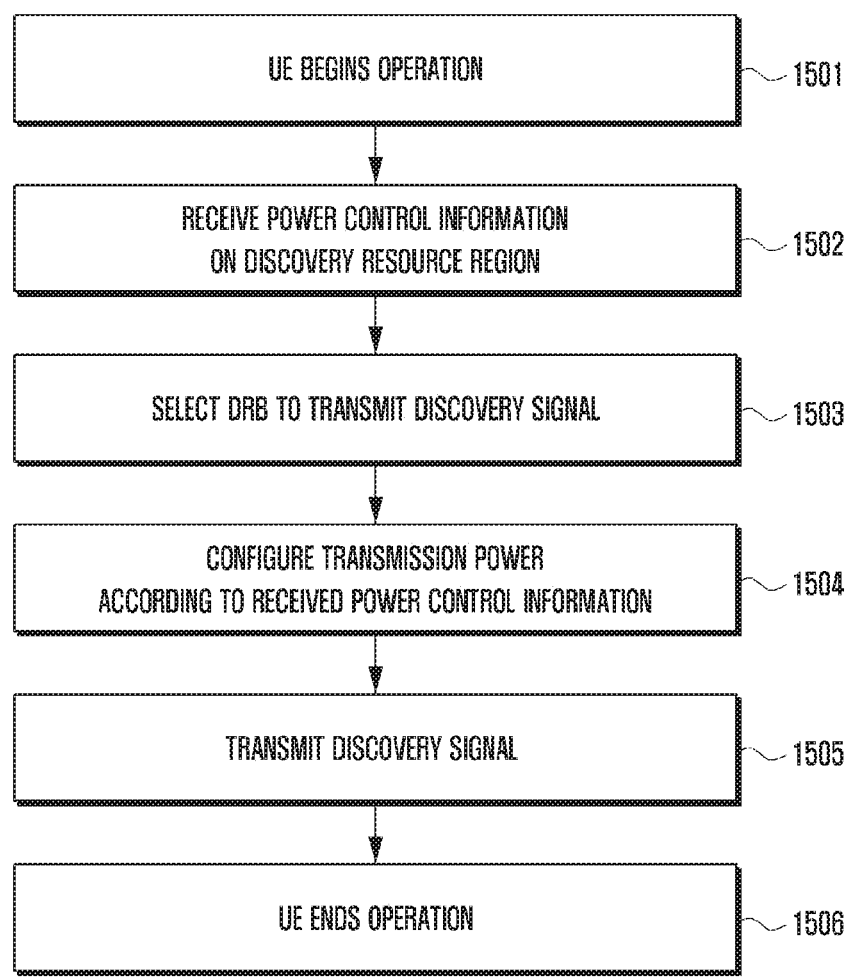
FIG. 15 is a flow chart illustrating an operation of a UE according to a fourth embodiment of the present invention.

FIG. 15 is a flow chart illustrating an operation of a UE according to a fourth embodiment of the present invention.

Referring to FIG. 15, in step 1501, the UE begins an operation.

In step 1502, the UE receives power control information on a discovery resource region from the base station. According to an embodiment, the power control information for the discovery signal region may include at least one of a method for controlling transmission power and a value of the transmission power in a specific resource region. The step 1502 may be selectively performed according to an embodiment, and when the step 1502 is not performed, the UE may use pre-configured information.

In step 1503, the UE configures a DRB for transmitting a discovery signal thereof among a discovery signal transmittable region. The DRB configuration may be determined according to the DRB position determined by the UE or base station, and the position of each transmission DRB may be different depending on the application of the time-frequency hopping.

In step 1504, the UE sets transmission power for the discovery signal according to the received power control information. In step 1505, the UE transmits the discovery signal by using the configured DRB region and transmission power. In step 1506, the UE ends the operation.

Figure 16:
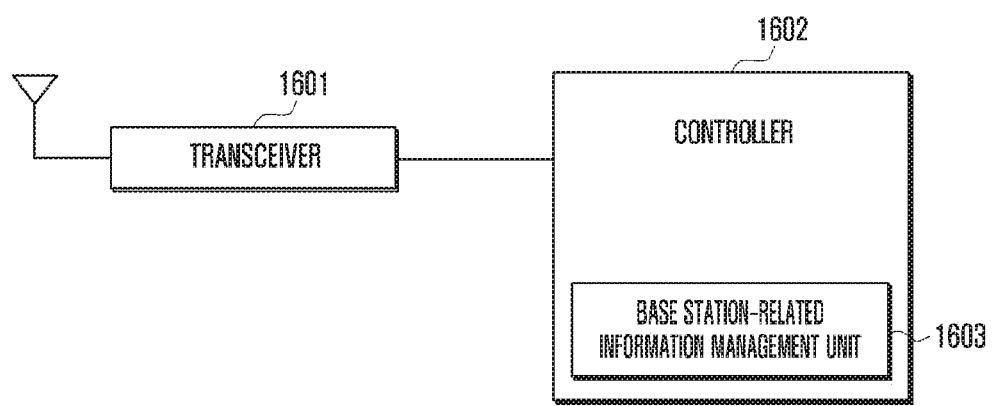
FIG. 16 is a diagram showing a configuration of a base station according to an embodiment of the present invention.

FIG. 16 is a diagram showing a configuration of a base station according to an embodiment of the present invention.

FIG. 16 is a block diagram illustrating an internal configuration of a base station according to an embodiment of the present invention. As shown in FIG. 16, the base station of the present invention may include a transceiver 1601 and controller 1602.

The transceiver 1601 transmits and receives a signal to and from nodes of a wireless communication system through a wired or wireless interface. For example, the transceiver 1601 may transmit and receive control information or data to and from a UE through the wireless interface.

The controller 1602 controls the signal flow between blocks for the operation of the base station. For example, the controller 1602 may control the sequence of operations for controlling transmission power for the discovery signal of the UE performing the D2D communication. To this end, the controller 1602 may further include a base station-related information management unit 1603.

The base station-related information management unit 1603 may control to transmit, to the UE, the base station-related information necessary for controlling transmission power for the discovery signal of the UE performing the D2D communication. According to each embodiment of the present invention, the base station-related information management unit 1603 may control to transmit, to the UE, additional transmission power control information on the discovery signal region division and each region according to the position of DRB.

Figure 17:
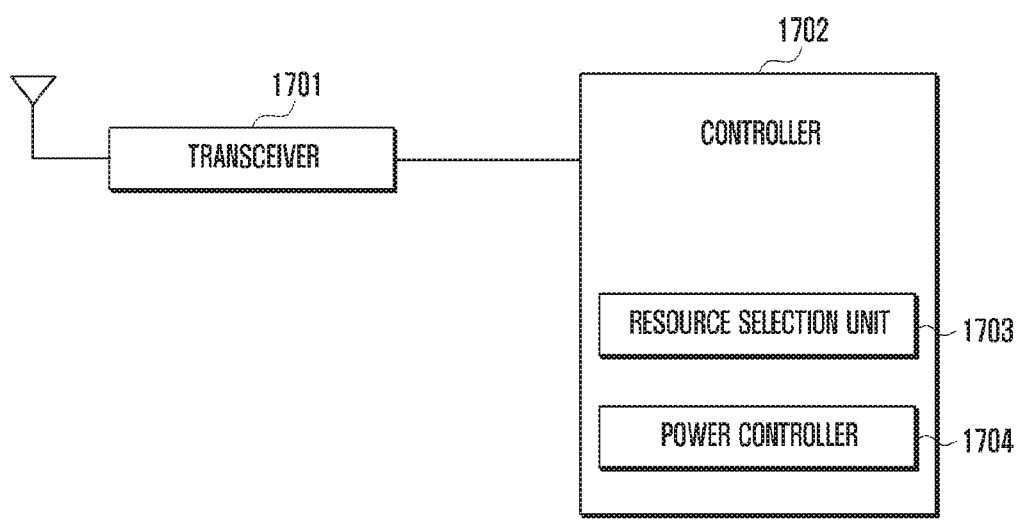
FIG. 17 is a diagram showing an internal structure of a UE according to an embodiment of the present invention.

FIG. 17 is a block diagram illustrating an internal structure of a UE according to an embodiment of the present invention.

As shown in FIG. 17, a UE of the present invention may include a transceiver 1701 and controller 1702.

The transceiver 1701 transmits and receives signals to and from a base station through a wireless interface. According to an embodiment of the invention, the transceiver 1701 may receive D2D-related information of the serving base station.

The controller 1702 controls the signal flow between blocks for the operation of the base station. The controller 1702 according to an embodiment of the present invention may select a discovery signal for performing D2D communication based on the D2D information received from the serving base station and control the transmission power of the selected discovery signal. To this end, the controller 1702 may further include a resource selection unit 1703 and a power controller 1704.

A resource selection unit 1703 may receive information on the DRB region from the base station, and select a transmission resource of the discovery signal for performing D2D communication on the basis of the received information. Since the specific process for selecting a resource of the discovery signal is mentioned above, a detailed description thereof will be omitted.

The power controller 1704 may receive power control information according to the DRB region from the base station, and control transmission power of the discovery signal for performing D2D communication on the basis of the received information. Since the specific process for controlling a transmission power of the discovery signal is mentioned above, a detailed description thereof will be omitted.

Meanwhile, exemplary embodiments of the present invention shown and described in this specification and the drawings correspond to specific examples presented in order to easily explain technical contents of the present invention, and to help comprehension of the present invention, but are not intended to limit the scope of the present invention. That is, those of skill in the art would recognize that the present disclosure belongs that different modifications that can be achieved based on the technical contents of the present disclosure.

Therefore, the detailed descriptions should not be construed to be limited in all aspects, but should be considered to be an example. The scope of the present disclosure should be determined by rational interpretation of the appended claims, and all modifications within a range equivalent to the present disclosure should be construed as being included in the scope of the present disclosure.

What is claimed is:

1. A method performed by a terminal in a communication system, the method comprising
 receiving, from a base station, configuration information for one or more discovery resource regions, the configuration information including time and frequency resource information and threshold information for each discovery resource region, wherein the threshold information is used for selecting a discovery resource region among the one or more discovery resource regions by comparing a reception signal power and the threshold information; and
 identifying a mechanism for selecting a discovery resource region between a first mechanism and a second mechanism,
 wherein the first mechanism is to select the discovery resource region based on the reception signal power and the threshold information, and the second mechanism is to randomly select the discovery resource region,
 wherein, in case that the first mechanism is determined for selecting the discovery resource region, the method further comprises:
   measuring reception signal power in resources associated with the one or more discovery resource regions;
   selecting the discovery resource region among the one or more discovery resource regions by comparing the measured reception signal power and the threshold information; and
   transmitting a discovery signal using at least one resource included in the selected discovery resource region by comparing the measured reception signal power and the threshold information, and
 wherein, in case that the second mechanism is determined for selecting the discovery resource region, the method further comprises:
   selecting the discovery resource region among the one or more discovery resource regions randomly; and
   transmitting the discovery signal using at least one resource included in the randomly selected discovery resource region.

2. The method of claim 1, wherein the configuration information further includes power control information associated with discovery signal transmission power for each of the one or more discovery resource regions.

3. The method of claim 2, further comprising:
 identifying the discovery signal transmission power based on the power control information of the selected discovery resource region.

4. The method of claim 3, wherein the discovery signal transmission power is identified as a minimum value between a maximum transmission power for the terminal and a transmission power determined based on a pathloss.

5. The method of claim 4, wherein the transmission power determined based on the pathloss is further determined based on resources for transmitting the discovery signal.

6. A method performed by a base station in a communication system, the method comprising:
    identifying one or more discovery resource regions and corresponding time and frequency resource information and threshold information associated with a reception signal power for selecting a discovery resource region for transmitting a discovery signal; and
    transmitting, to a terminal, configuration information for the one or more discovery resource regions, the configuration information including time and frequency resource information and threshold information for each discovery resource region, wherein the threshold information is used for selecting the discovery resource region among the one or more discovery resource regions by comparison with the reception signal power,
    wherein a mechanism for selecting a discovery resource region corresponds to a first mechanism or a second mechanism,
    wherein the first mechanism is to select the discovery resource region based on the reception signal power and the threshold information, and the second mechanism is to randomly select the discovery resource region,
    wherein the discovery resource region is selected among the one or more discovery resource regions based on a reception signal power measured by the terminal and the threshold information, for the first mechanism, and
    wherein the discovery resource region is randomly selected among the one or more discovery resource regions, for the second mechanism.

7. The method of claim 6, wherein the configuration information further includes power control information associated with discovery signal transmission power for each of the one or more discovery resource regions.

8. The method of claim 7, wherein the discovery signal transmission power is identified based on the power control information of the selected discovery resource region.

9. The method of claim 8, wherein the discovery signal transmission power is identified as a minimum value between a maximum transmission power for the terminal and a transmission power determined based on a pathloss.

10. The method of claim 9, wherein the transmission power determined based on the pathloss is further determined based on resources for transmitting the discovery signal.

11. A terminal in a communication system, the terminal comprising:
    a transceiver; and
    a controller coupled with the transceiver and configured to:
        receive, from a base station via the transceiver, configuration information for one or more discovery resource regions, the configuration information including time and frequency resource information and threshold information for each discovery resource region, wherein the threshold information is used for selecting a discovery resource region among the one or more discovery resource regions by comparing a reception signal power and the threshold information, and
        identify a mechanism for selecting a discovery resource region between a first mechanism and a second mechanism,
    wherein the first mechanism is to select the discovery resource region based on the reception signal power and the threshold information, and the second mechanism is to randomly select the discovery resource region,
    wherein, in case that the first mechanism is determined for selecting the discovery resource region, the controller is further configured to:
        measure reception signal power in resources associated with the one or more discovery resource regions,
        select the discovery resource region among the one or more discovery resource regions by comparing the measured reception signal power and the threshold information, and
        transmit a discovery signal using at least one resource included in the selected discovery resource region, and
    wherein, in case that the second mechanism is determined for selecting the discovery resource region, the controller is further configured to:
        select the discovery resource region among the one or more discovery resource regions randomly; and
        transmit the discovery signal using at least one resource included in the randomly selected discovery resource region.

12. The terminal of claim 11, wherein the configuration information further includes power control information associated with discovery signal transmission power for each of the one or more discovery resource regions.

13. The terminal of claim 12, wherein the controller is further configured to identify the discovery signal transmission power based on the power control information of the selected discovery resource region.

14. The terminal of claim 13, wherein the discovery signal transmission power is identified as a minimum value between a maximum transmission power for the terminal and a transmission power determined based on a pathloss.

15. The terminal of claim 14, wherein the transmission power determined based on the pathloss is further determined based on resources for transmitting the discovery signal.

16. A base station in a communication system, the base station comprising:
    a transceiver; and
    a controller coupled with the transceiver and configured to:
        identify one or more discovery resource regions and corresponding time and frequency resource information and threshold information associated with a reception signal power for selecting a discovery resource region for transmitting a discovery signal, and
        transmit, to a terminal via the transceiver, configuration information for the one or more discovery resource regions, the configuration information including time and frequency resource information and threshold information for each discovery resource region, wherein the threshold information is used for selecting the discovery resource region among the one or more discovery resource regions by comparison with the reception signal power,
    wherein a mechanism for selecting a discovery resource region corresponds to a first mechanism or a second mechanism, wherein the first mechanism is to select the discovery resource region based on the reception signal power and the threshold information, and the second mechanism is to randomly select the discovery resource region, wherein the discovery resource region is selected among the one or more discovery resource regions based on a reception signal power measured by the terminal and the threshold information, for the first mechanism, and wherein the discovery resource region is randomly selected among the one or more discovery resource regions, for the second mechanism.

17. The base station of claim 16, wherein the configuration information further includes power control information associated with discovery signal transmission power for each of the one or more discovery resource regions.

18. The base station of claim 17, wherein the discovery signal transmission power is identified based on the power control information of the selected discovery resource region.

19. The base station of claim 18, wherein the discovery signal transmission power is identified as a minimum value between a maximum transmission power for the terminal and a transmission power determined based on a pathloss.

20. The base station of claim 19, wherein the transmission power determined based on the pathloss is further determined based on resources for transmitting the discovery signal.

* * * * *